(12) United States Patent
Koito

(10) Patent No.: US 11,774,786 B2
(45) Date of Patent: Oct. 3, 2023

(54) VIEW-ANGLE CONTROL DEVICE AND DISPLAY DEVICE

(71) Applicant: Japan Display Inc., Tokyo (JP)

(72) Inventor: Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/885,694

(22) Filed: Aug. 11, 2022

(65) Prior Publication Data

US 2023/0052905 A1    Feb. 16, 2023

(30) Foreign Application Priority Data

Aug. 16, 2021 (JP) ................. 2021-132373

(51) Int. Cl.
| | |
|---|---|
| *G02F 1/13* | (2006.01) |
| *G02F 1/1343* | (2006.01) |
| *G02F 1/1335* | (2006.01) |
| *G02F 1/1362* | (2006.01) |

(52) U.S. Cl.
CPC ...... *G02F 1/1323* (2013.01); *G02F 1/133512* (2013.01); *G02F 1/133528* (2013.01); *G02F 1/134309* (2013.01); *G02F 1/136209* (2013.01); *G02F 1/1343* (2013.01); *G09G 2320/068* (2013.01)

(58) Field of Classification Search
CPC ............. G02F 1/1323; G02F 1/133512; G02F 1/136209; G02F 1/1343; G02F 1/134309; G02F 1/134363; G02F 1/134372; G09G 2320/068
See application file for complete search history.

(56) References Cited

U.S. PATENT DOCUMENTS

| | | | |
|---|---|---|---|
| 2006/0267905 A1* | 11/2006 | Nishino | G09G 3/3648 345/98 |
| 2008/0144179 A1 | 6/2008 | Mimura et al. | |
| 2019/0285918 A1* | 9/2019 | Li | G02F 1/29 |
| 2021/0173240 A1* | 6/2021 | Li | G02F 1/133504 |
| 2022/0004054 A1* | 1/2022 | Chih | G02F 1/1323 |
| 2022/0113568 A1* | 4/2022 | Chen | G02F 1/133707 |

FOREIGN PATENT DOCUMENTS

JP    2008-107404 A    5/2008

* cited by examiner

*Primary Examiner* — Jonathan Y Jung
(74) *Attorney, Agent, or Firm* — K&L Gates LLP

(57) ABSTRACT

According to an aspect, a view-angle control device includes: a drive layer in which light-transmitting regions and switchable regions are alternately arranged in one direction, each light-transmitting region being configured to transmit light, each switchable region being switchable between a light-transmitting state and a light-blocking state through switching of liquid crystal orientation; and a plurality of optical member layers stacked together with the drive layer. Each optical member layer includes a base member that transmits light and a light-blocking part that is provided at a position overlapping with the switchable region and blocks light. The light-blocking part is disposed on a surface of the base member on a farther side from the drive layer.

7 Claims, 17 Drawing Sheets

FIG.17
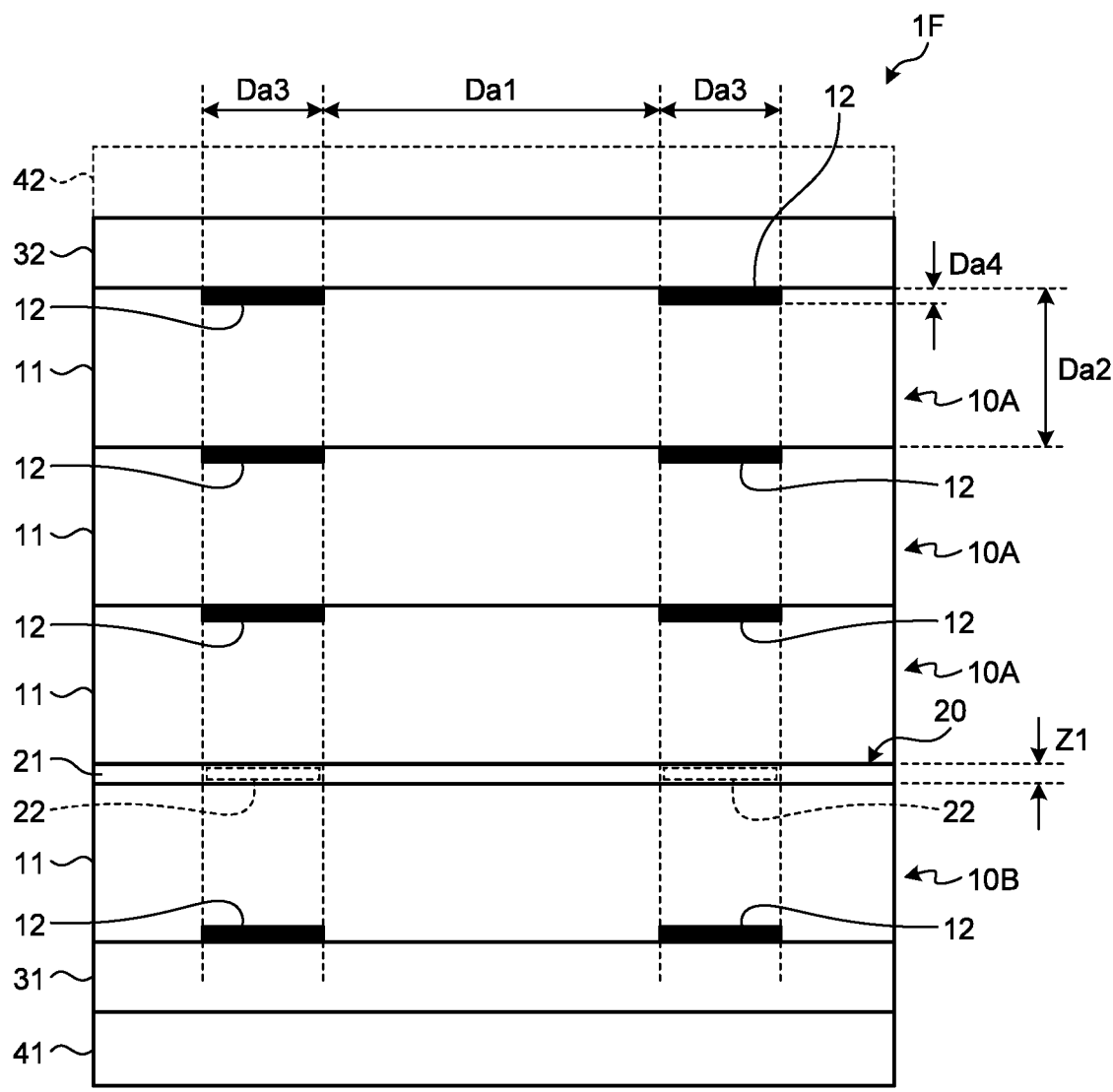
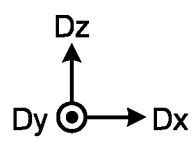

FIG.19
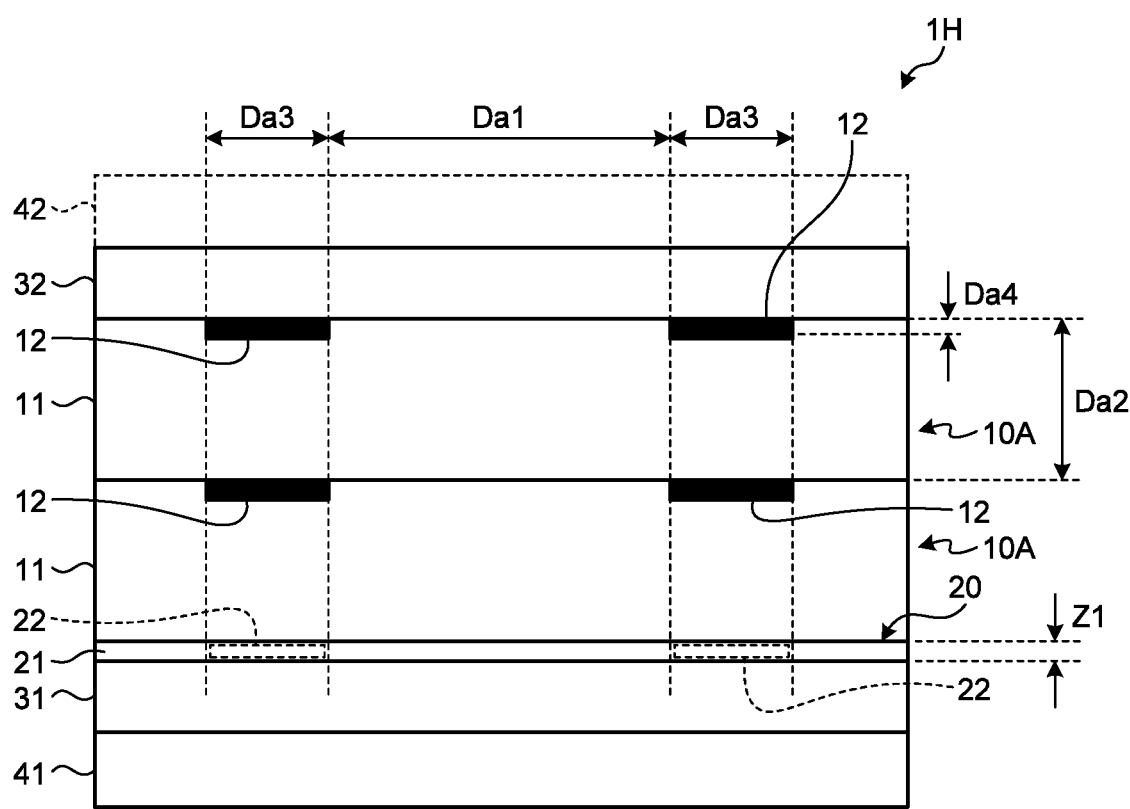
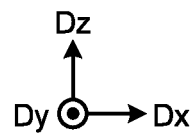

VIEW-ANGLE CONTROL DEVICE AND DISPLAY DEVICE

CROSS-REFERENCE TO RELATED APPLICATION

This application claims the benefit of priority from Japanese Patent Application No. 2021-132373 filed on Aug. 16, 2021, the entire contents of which are incorporated herein by reference.

BACKGROUND

1. Technical Field

What is disclosed herein relates to a view-angle control device and a display device.

2. Description of the Related Art

As described in Japanese Patent Application Laid-open Publication No. 2008-107404 (JP-A-2008-107404), a mechanism for narrowing a view-angle by providing a micro-louver has been known.

When a diffusion layer is provided on the micro-louver for narrowing a view-angle as in JP-A-2008-107404, luminance is likely to be insufficient due to light diffusion by the diffusion layer even when observed at a front viewpoint where an image can be visually recognized. With such a configuration, the luminance of light from a light source needs to be increased for sufficient luminance, which leads to inefficiency. Furthermore, with the configuration disclosed in JP-A-2008-107404, switching between a narrow view angle and a wide view angle is achieved through attaching and detaching of a member having a micro-louver structure, which leads to cumbersome switching work.

For the foregoing reasons, there is a need for a view-angle control device and a display device that can switch the view angle without attaching and detaching and can increase luminance when observed at a front viewpoint.

SUMMARY

According to an aspect of the present disclosure, a view-angle control device includes: a drive layer in which light-transmitting regions and switchable regions are alternately arranged in one direction, each light-transmitting region being configured to transmit light, each switchable region being switchable between a light-transmitting state and a light-blocking state through switching of liquid crystal orientation; and a plurality of optical member layers stacked together with the drive layer. Each optical member layer includes a base member that transmits light and a light-blocking part that is provided at a position overlapping with the switchable region and blocks light. The light-blocking part is disposed on a surface of the base member on a farther side from the drive layer.

BRIEF DESCRIPTION OF THE DRAWINGS

FIG. 17 is a schematic diagram illustrating an exemplary configuration of another view-angle control device;

FIG. 19 is a schematic diagram illustrating an exemplary configuration of another view-angle control device.

DETAILED DESCRIPTION

An embodiment of this disclosure is described below with reference to the drawings. What is disclosed herein is only an example, and any changes that can be easily conceived by those skilled in the art while maintaining the main purpose of the invention are naturally included in the scope of the disclosure. The drawings may be schematically represented in terms of the width, thickness, shape, and the like of each part compared to those in the actual form for the purpose of clearer explanation, but they are only examples and do not limit the interpretation of this disclosure. In the present specification and the drawings, the same reference signs are applied to the same elements as those already described for the previously mentioned drawings, and their detailed explanations may be omitted as appropriate.

Figure 1:
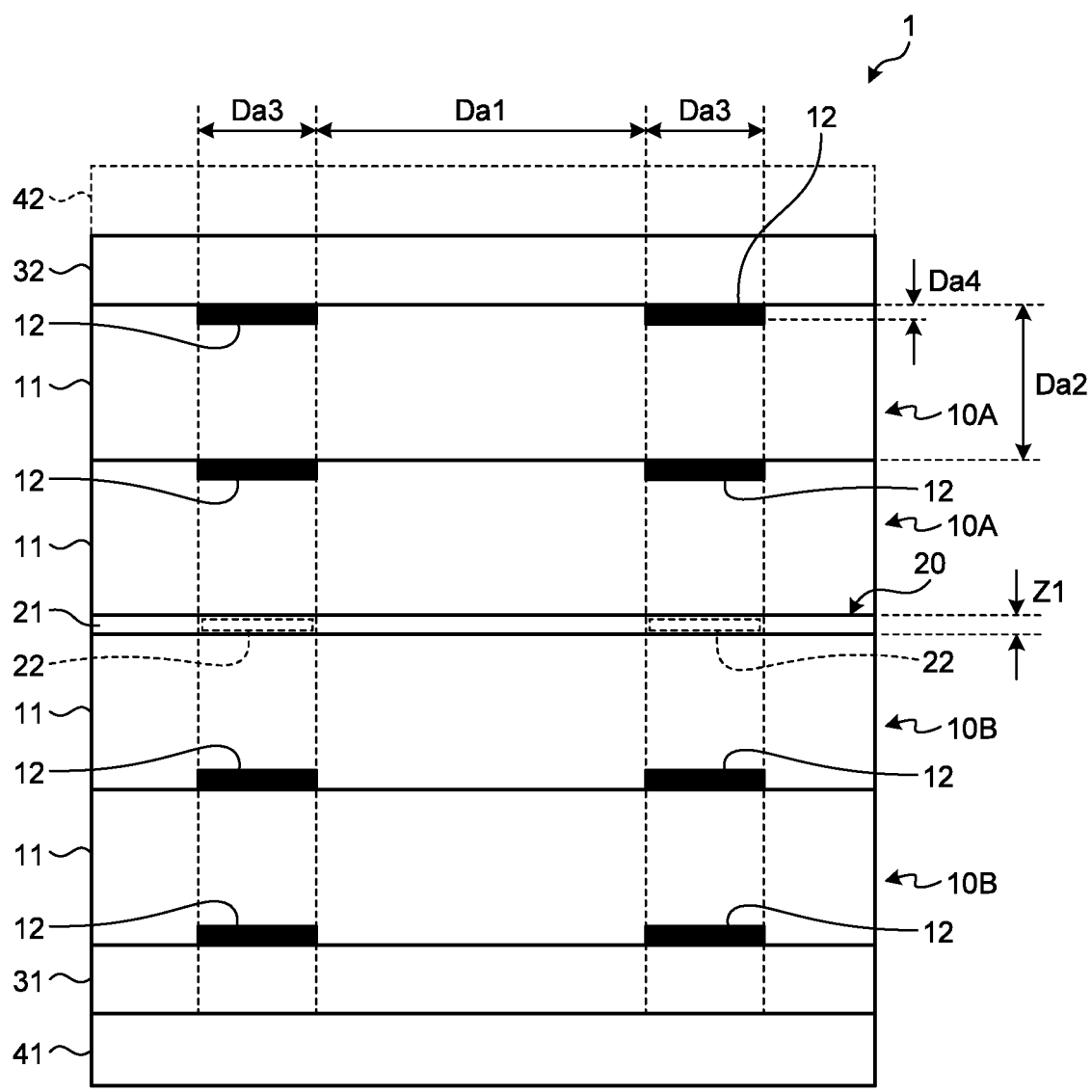
FIG. 1 is a schematic diagram illustrating an exemplary configuration of a view-angle control device.

FIG. 1 is a schematic diagram illustrating an exemplary configuration of a view-angle control device 1. The view-angle control device 1 includes optical member layers 10A and 10B, a drive layer 20, substrates 31 and 32, and polarization layers 41 and 42. As illustrated in FIG. 1, the view-angle control device 1 has a configuration in which components including the polarization layer 41, the substrate 31, the optical member layers 10B, the drive layer 20, the optical member layers 10A, the substrate 32, and the polarization layer 42 are stacked in the stated order from one surface side (light entrance surface side) toward the other surface side (light emission surface side).

In the following description, a third direction Dz (stacking direction) is defined as a direction in which the components including the drive layer 20 are stacked. In addition, a first direction Dx is defined as one of two directions orthogonal to the third direction Dz, and a second direction Dy is defined as the other direction thereof. The first direction Dx and the second direction Dy are orthogonal to each other. An extending direction of the optical member layers 10A, the optical member layers 10B, the drive layer 20, the substrate 31, the substrate 32, the polarization layer 41, and the polarization layer 42 is orthogonal to the third direction Dz.

The optical member layers 10A and the optical member layers 10B each include a base member 11 and a light-blocking part 12. The base member 11 is a light-transmitting member shaped as a film. Specifically, the base member 11 is made of a light-transmitting synthesis resin that is curable through, for example, ultraviolet irradiation or thermal change (heating, cooling, or both). More specifically, the base member 11 is, for example, an acrylic resin film. The base member 11 is formed through a manufacturing process including, for example, a slit coating process, a spin coating process, or a process including both (slit and spin). The light-blocking part 12 is a member having light-blocking properties. Specifically, the light-blocking part 12 is made of a black synthesis resin or chromium (Cr) that is fabricated to have reduced light reflectivity at the outer peripheral surface.

Each light-blocking part 12 is provided on a surface of the corresponding base member 11. As illustrated in FIG. 1, the light-blocking part 12 included in any optical member layer 10A is positioned on the other surface side of the base member 11 of the optical member layer 10A. The light-blocking part 12 included in any optical member layer 10B is positioned on the one surface side of the base member 11 of the optical member layer 10B. In other words, each light-blocking part 12 is provided on a surface farther from the drive layer 20 among the front and back surfaces of the corresponding base member 11.

Figure 7:
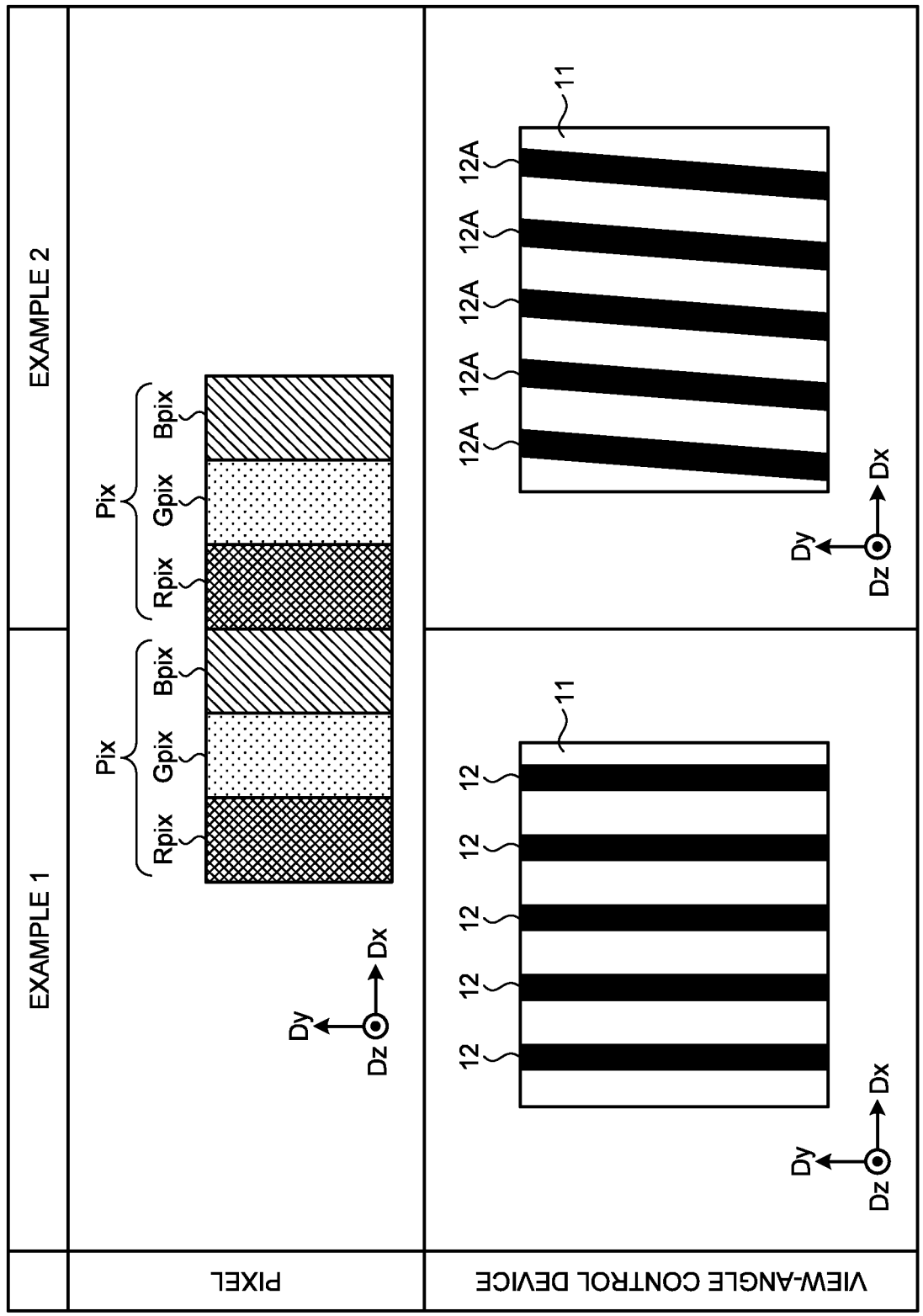
FIG. 7 is a schematic diagram illustrating an exemplary relation of pixels and sub pixels provided on the display panel with light-blocking parts provided in the view-angle control device.

A plurality of the light-blocking parts 12 are provided in each base member 11. Specifically, the light-blocking parts 12 are arranged in the first direction Dx as illustrated in FIGS. 1 and 7 to be described later. Each light-blocking part 12 extends in a direction intersecting the first direction Dx when observed at a planar viewpoint. The planar viewpoint is a viewpoint in a front view of a plane orthogonal to the third direction Dz.

As illustrated in FIG. 1, the positions of the light-blocking parts 12 included in the optical member layers 10A and 10B provided in the view-angle control device 1 overlap in the third direction Dz. The positions of switchable regions 22 in the drive layer 20 overlap with the positions of the light-blocking parts 12 included in the optical member layers 10A and 10B provided in the view-angle control device 1 in the third direction Dz. In other words, the light-blocking parts 12 included in the stacked optical member layers 10A and 10B overlap with the switchable regions 22 of the drive layer 20 in plan view. Thus, an area Da1 in which each base member 11 and a light-transmitting region 21 transmit light is formed between adjacent light-blocking parts 12. The area Da1 between two light-blocking parts 12 is, for example, an area of 10 micrometers (μm) or 14.5 μm in the first direction Dx. In addition, an area Da3 of each light-blocking part 12 and the corresponding switchable region 22 in the first direction Dx is, for example, an area of 4.5 μm in the first direction Dx.

Each base member 11 has a thickness Da2 of, for example, 6.5 μm in the third direction Dz. Each light-blocking part 12 functions as a light-blocking part having an optical density (OD) value of three or greater and thus is formed to have a thickness Da4 of 1.5 μm or greater. Thus, the distance between light-blocking parts 12 overlapping with each other in the third direction Dz is 5 μm.

The drive layer 20 includes the light-transmitting regions 21 and the switchable regions 22. Each light-transmitting region 21 is a part that can transmit light constantly during operation of the drive layer 20. Each switchable region 22 is a part that is switchable between a light-transmitting state and a light-blocking state during the operation of the drive layer 20. An exemplary specific configuration for achieving such operation of the drive layer 20 will be described later. The drive layer 20 has a thickness Z1 of, for example, 3 μm in the third direction Dz.

The substrate 31 and the substrate 32 are a light-transmitting substrate. Specifically, the substrate 31 and the substrate 32 are each a glass substrate or a substrate made of a transparent resin. In the view-angle control device 1, the two optical member layers 10B are stacked on the other surface side of the substrate 31. The two optical member layers 10A are stacked on the one surface side of the substrate 32. In addition, a part that functions as the drive layer 20 is formed between the substrate 31 on which the two optical member layers 10B are formed and the substrate 32 on which the two optical member layers 10A are formed.

The polarization layer 41 and the polarization layer 42 each transmit light in a particular polarization direction and block light in the other polarization direction. Exemplary polarization directions of light transmitted by the polarization layer 41 and the polarization layer 42 will be described later.

In reality, any one of the polarization layer 41 and the polarization layer 42 is provided in the view-angle control device 1, and the other is omitted. The other polarization layer that is omitted is provided in a display panel (for example, a display panel 90 illustrated in FIG. 5 to be described later) stacked together with the view-angle control device 1. In other words, the polarization layer provided in the display panel doubles as a polarization layer of the view-angle control device 1. Hereinafter a view-angle control device 1A refers to a view-angle control device obtained by omitting the polarization layer 42 from the view-angle control device 1. A view-angle control device 1B refers to a view-angle control device obtained by omitting the polarization layer 41 from the view-angle control device 1.

Figure 2:
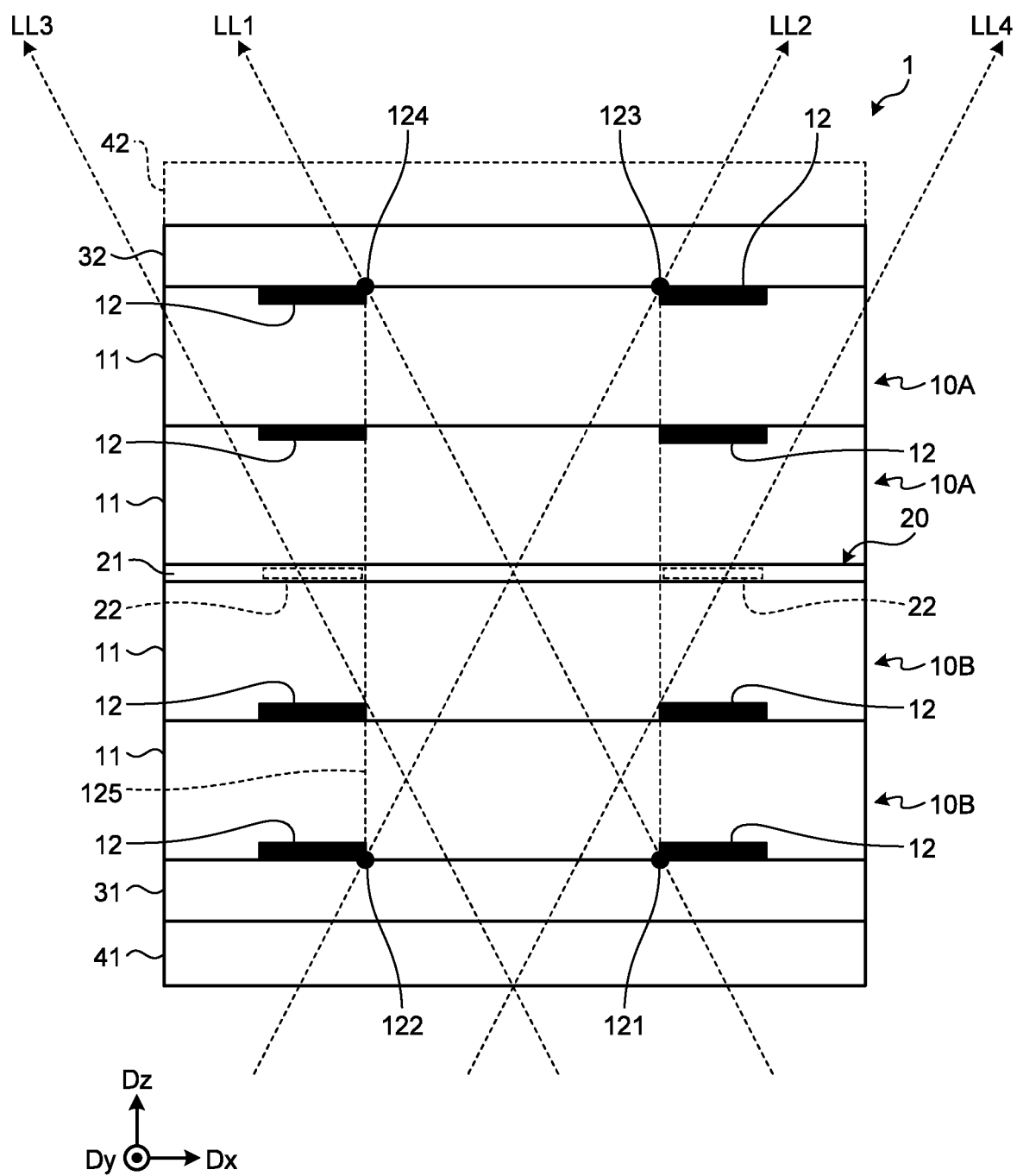
FIG. 2 is a schematic diagram illustrating light travel when a switchable region is in a light-transmitting state.
Figure 3:
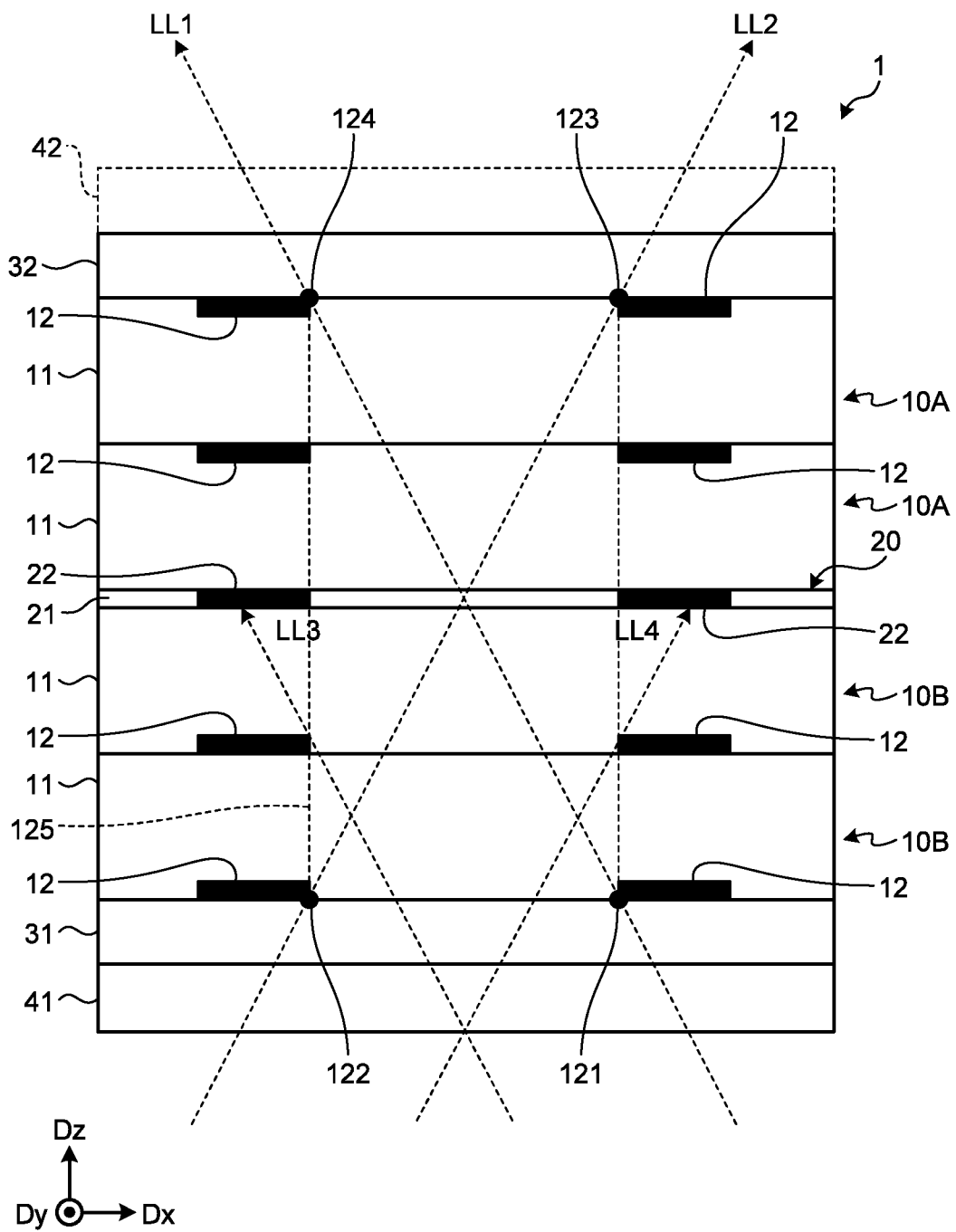
FIG. 3 is a schematic diagram illustrating light travel when the switchable region is in a light-blocking state.
Figure 4:
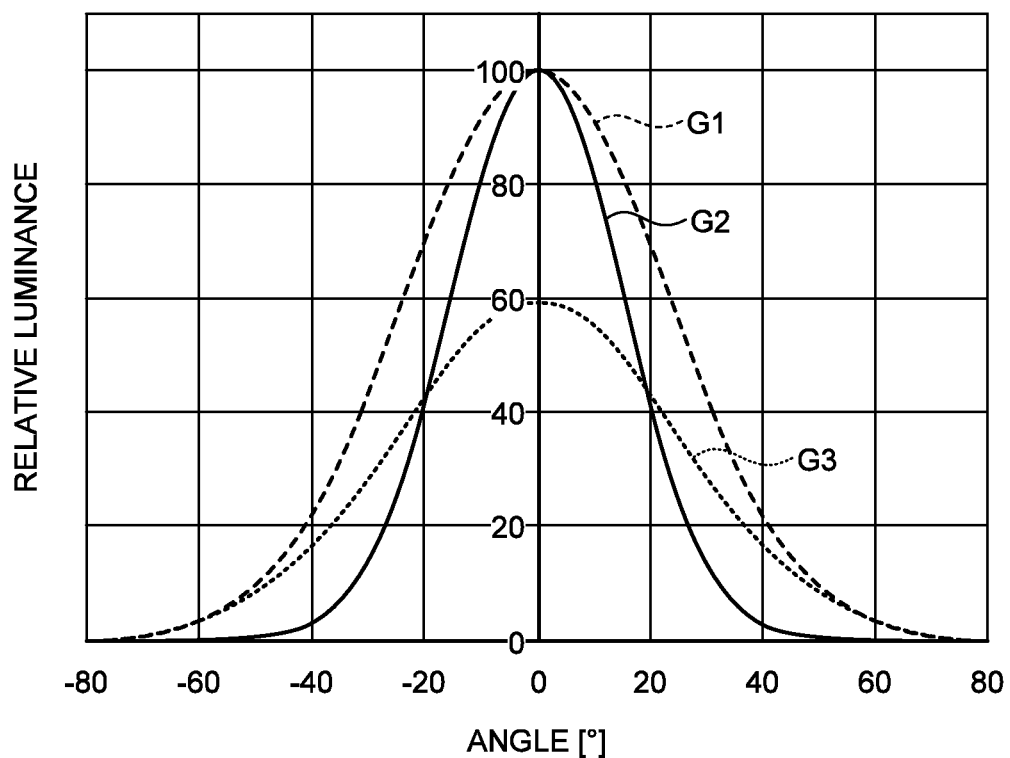
FIG. 4 is a graph illustrating view-angle performance and relative luminance of each of the view-angle control device and a comparative example.

The following describes, with reference to FIGS. 2 to 4, effects of switching of each switchable region 22 between a light-transmitting state and a light-blocking state during operation of the view-angle control device 1.

FIG. 2 is a schematic diagram illustrating travel of light rays LL1, LL2, LL3, and LL4 when the switchable regions 22 are in a light-transmitting state. FIG. 3 is a schematic diagram illustrating travel of the light rays LL1, LL2, LL3, and LL4 when the switchable regions 22 are in a light-blocking state. An area 125 transmits light irrespective of whether the switchable regions 22 transmit or block light. The area 125 is surrounded by end-part vertices 121 and 122 of on the one surface side of two adjacent light-blocking parts 12 in the optical member layer 10B nearest to the substrate 31 and end-part vertices 123 and 124 of on the one surface side of two adjacent light-blocking parts 12 in the optical member layer 10A nearest to the substrate 32. Thus, the light ray LL1 passing through the end-part vertices 121 and 124, the light ray LL2 passing through the end-part vertices 122 and 123, and light traveling within an angle range formed by the light rays LL1 and LL2 transmit through the view-angle control device 1 irrespective of the state of the switchable regions 22.

As illustrated in FIG. 2, when the switchable regions 22 are in a light-transmitting state, light (for example, the light rays LL3 and LL4) entering the area 125 in an oblique direction and reaching the switchable region 22 of the drive layer 20 also transmits through the view-angle control device 1.

However, as illustrated in FIG. 3, when the switchable regions 22 are in a light-blocking state, light (for example, the light rays LL3 and LL4) entering the area 125 in an oblique direction and reaching the switchable region 22 of the drive layer 20 is blocked by the switchable region 22 and cannot transmit through the view-angle control device 1.

Thus, in a case of a configuration with which a user (human being) visually recognizes an image based on light passing through the view-angle control device 1 such as the light rays LL1, LL2, LL3, and LL4, the view angle in the first direction Dx when the switchable regions 22 are in a light-blocking state is narrower than that when the switchable regions 22 are in a light-transmitting state. This is because the light rays LL3 and LL4, which are visually recognized by the user when the switchable regions 22 are in a light-transmitting state, cannot be visually recognized by the user when the switchable regions 22 are in a light-blocking state.

FIG. 4 is a graph illustrating view-angle performance and relative luminance of each of the view-angle control device 1 and a comparative example. A graph G1 illustrated in FIG. 4 illustrates view-angle performance in the first direction Dx with which the user can visually recognize light transmitting through the view-angle control device 1 when the switchable regions 22 are in a light-transmitting state as illustrated in FIG. 2. A graph G2 illustrated in FIG. 4 illustrates view-angle performance in the first direction Dx with which the user can visually recognize light transmitting through the view-angle control device 1 when the switchable regions 22 are in a light-blocking state as illustrated in FIG. 3. A graph G3 illustrated in FIG. 4 illustrates view-angle performance in the first direction Dx with which the user can visually recognize light transmitting through a configuration for view-angle control (a micro-louver and a diffusion layer) according to the comparative example. The angle of 0 degrees)(° on the horizontal axis in FIG. 4 corresponds to a case in which the positional relation between the view-angle control device 1 and the user is a positional relation in which the line of sight of the user can visually recognize light traveling in the third direction Dz. More specifically, the angle of 0° corresponds to a state in which the line of sight of the user is aligned with a normal direction of the view-angle control device 1. An absolute value of the angle indicates the angle of the line of sight of the user with respect to the above-described normal direction. A larger absolute value of the angle means that the user views the view-angle control device 1 in a more oblique direction. In FIG. 4, luminance on the graph G1 at the angle of 0°, in other words, front-side luminance when the switchable regions 22 are in a light-transmitting state, is assumed to be 100, and relative luminance at each position on each graph is indicated with reference to the front-side luminance. The angle of +n° corresponds to a case in which the user visually recognizes light from the view-angle control device 1 from one direction side in the first direction Dx at the angle of a sight line intersecting the third direction Dz at n° with reference to the angle of 0°. The angle of −n° corresponds to a case in which the user visually recognizes light from the view-angle control device 1 from the other direction side in the first direction Dx at the angle of a sight line intersecting the third direction Dz at n° with reference to the angle of 0°.

As illustrated with the graphs G1 and G2 in FIG. 4, in a case of the angle of 0°, the luminance of light that can be visually recognized by the user is highest (100) irrespective of whether the switchable regions 22 transmit or block light. In other words, even when the switchable regions 22 are in a light-transmitting state, in a case of the angle of 0°, it can be ensured to provide substantially the same light luminance as that when the switchable regions 22 are in a light-blocking state.

For example, at the angles of ±20°, when the switchable regions 22 are in a light-transmitting state, the view-angle control device 1 can transmit 75% of light transmitted at the angle of 0° as illustrated with the graph G1. In contrast, when the switchable regions 22 are in a light-blocking state, the view-angle control device 1 can only transmit 40% of light transmitted at the angle of 0° as illustrated with the graph G2.

For example, at the angles of ±40°, when the switchable regions 22 are in a light-transmitting state, the view-angle control device 1 can transmit 20% or more of light transmitted at the angle of 0° as illustrated with the graph G1. In contrast, when the switchable regions 22 are in a light-blocking state, light is hardly transmitted as illustrated with the graph G2. In this manner, it is possible, by switching the state of the switchable regions 22, to control the view-angle performance of the view-angle control device 1 and a configuration including the view-angle control device 1.

As illustrated with the graph G3, the overall luminance of visually recognizable light decreases in a case of a configuration in which a diffusion layer is provided on a micro-louver as disclosed in JP-A-2008-107404 described above. In particular, the light luminance obtained at the angle of 0° in the comparative example is only about 60% of that in a case of the view-angle control device 1. Note that there is no difference in configuration between the present disclosure and the comparative example except for a configuration for controlling the view angle.

The comparative example needs an additional measure such as increasing the luminance of light output from a light source to make a user visually recognize light of a luminance equivalent to that obtained with the configuration according to the present disclosure. In contrast, according to the present disclosure, light of higher luminance can be visually recognized by the user irrespective of conditions, as compared to the comparative example.

Figure 5:
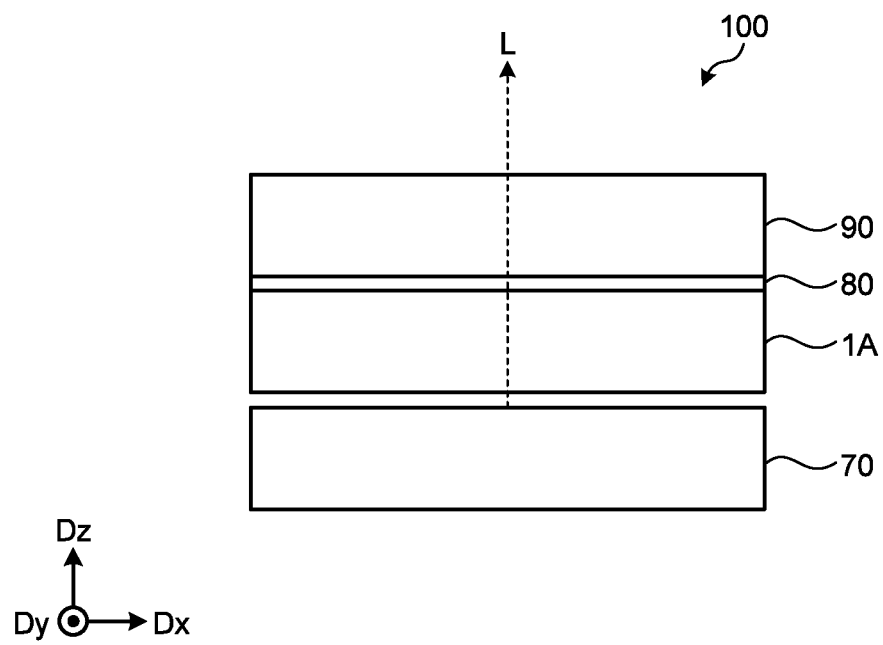
FIG. 5 is a schematic diagram illustrating an exemplary configuration of a display device.
Figure 6:
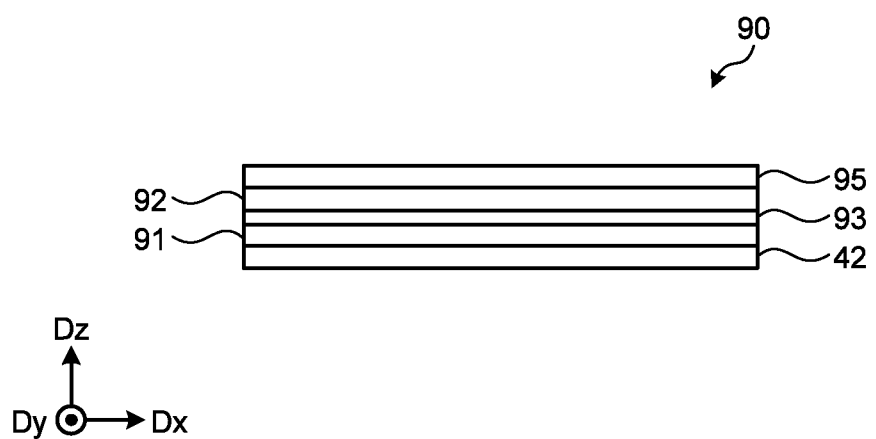
FIG. 6 is a schematic diagram illustrating an exemplary configuration of a display panel.

The following describes an exemplary configuration of a display device 100 including the view-angle control device 1 with reference to FIGS. 5 to 7.

FIG. 5 is a schematic diagram illustrating the exemplary configuration of the display device 100. The display device 100 includes the view-angle control device 1A, a backlight 70, a bonding layer 80, and the display panel 90. The backlight 70, the view-angle control device 1A, the bonding layer 80, and the display panel 90 are stacked in the stated order in the display device 100.

The backlight 70 emits light L that travels from one surface side of the view-angle control device 1A toward the other surface side. Specifically, the backlight 70 includes an optical element such as a light emitting diode (LED). The backlight 70 emits the light L by turning on the optical element.

The bonding layer 80 bonds the view-angle control device 1A and the display panel 90. Specifically, the bonding layer 80 is a light-transmitting functional film having double sided adhesiveness, such as an optical clear adhesive (OCA).

FIG. 6 is a schematic diagram illustrating an exemplary configuration of the display panel 90. The display panel 90 is a transmissive liquid crystal display panel. The display panel 90 includes a first substrate 91, a second substrate 92, a liquid crystal 93, a polarization layer 42, and a polarization layer 95.

The first substrate 91 is a light-transmitting substrate provided with switching elements, pixel electrodes, and the like for driving a plurality of sub pixels (for example, a first sub pixel Rpix, a second sub pixel Gpix, and a third sub pixel Bpix illustrated in FIG. 7 to be described later) provided in the display panel 90 in an active matrix scheme. The second substrate 92 is a light-transmitting substrate on which color filters or the like provided for the respective sub pixels are disposed. The liquid crystal 93 contains liquid crystal molecules that are sealed between the first substrate 91 and the second substrate 92. The orientation of the liquid crystal molecules is controlled in accordance with voltage from each sub pixel.

The polarization layer 42 has the same configuration as the polarization layer 42 of the view-angle control device 1 described above. Specifically, in the display device 100, the polarization layer on the other surface side in the view-angle control device 1A and the polarization layer on the one surface side in the display panel 90 are integrated into the polarization layer 42. The polarization layer 95 transmits, for example, light polarized in a direction intersecting at 90° with the polarization direction of light transmitting through the polarization layer 42 when observed at the planar viewpoint. With a combination of the polarization direction of light transmitting through the polarization layer 42, the polarization direction of light transmitting through the polarization layer 95, and the orientation of liquid crystal molecules disposed at the position of the sub pixel, the display panel 90 outputs an image by controlling the degree of light transmitting at each sub pixel.

FIG. 7 is a schematic diagram illustrating an exemplary relation of pixels Pix and sub pixels provided in the display panel 90 with the light-blocking parts 12 provided in the view-angle control device 1. In the example illustrated in FIG. 7, each pixel Pix includes the first sub pixel Rpix, the second sub pixel Gpix, and the third sub pixel Bpix in both Example 1 and Example 2. Each first sub pixel Rpix is provided to allow transmission of red light. Each second sub pixel Gpix is provided to allow transmission of green light. Each third sub pixel Bpix is provided to allow transmission of blue light. The shapes of the first sub pixel Rpix, the second sub pixel Gpix, and the third sub pixel Bpix when observed at the planar viewpoint are rectangular shapes with a width in the second direction Dy longer than that in the first direction Dx. In the following description, a sub pixel refers to any of the first sub pixel Rpix, the second sub pixel Gpix, and the third sub pixel Bpix.

In both Examples 1 and 2, the light-blocking parts 12 (or light-blocking parts 12A) are arranged in the first direction Dx at a pitch that is equal to or less than an arrangement pitch of the pixel electrodes of the sub pixels. In Example 1, the longitudinal direction of each light-blocking part 12 extends in the second direction Dy, but the longitudinal direction may extend in the direction of a straight line intersecting the first direction Dx and the second direction Dy like the light-blocking parts 12A in Example 2. Each light-blocking part 12A has the same configuration as each light-blocking part 12 except for the longitudinal direction thereof different from that of the light-blocking part 12 and may be provided to each base member 11 in place of the light-blocking part 12. The angle of the longitudinal direction of each light-blocking parts 12A with respect to the second direction Dy may be a freely-determined angle within a range of, for example, 5° to 20°, but the angle is not limited thereto and may be changeable as appropriate. When the longitudinal direction of the light-blocking parts of the view-angle control device 1 intersects the longitudinal direction of the sub pixels like the light-blocking parts 12A, it is possible to more reliably reduce generation of moire of light transmitting through the sub pixels due to interference with the arrangement pattern of the light-blocking parts 12A.

Figure 8:
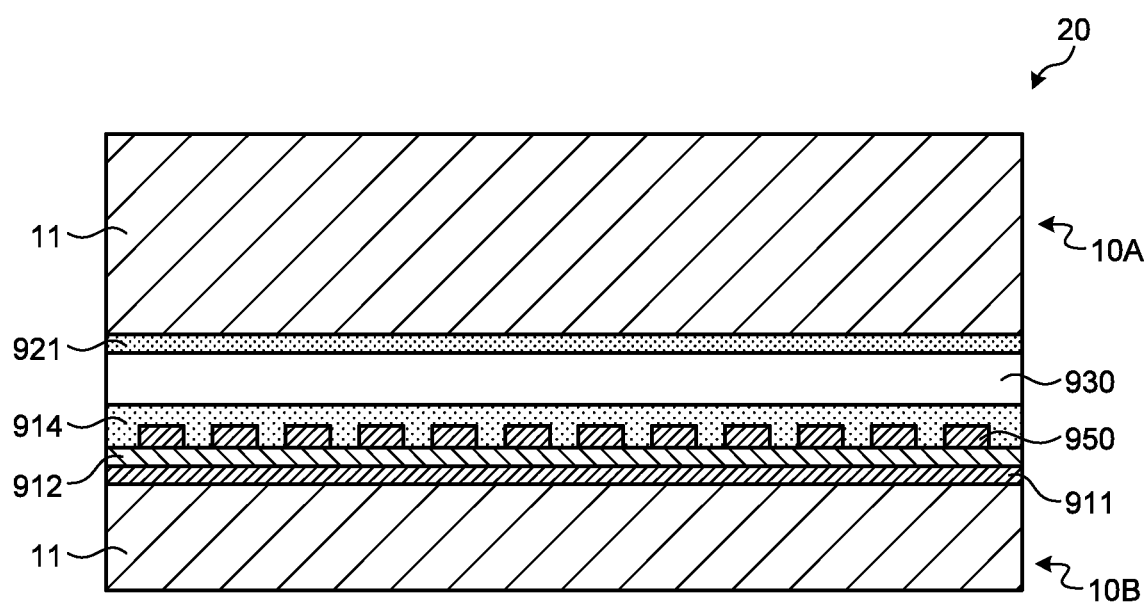
FIG. 8 is a sectional view illustrating an exemplary configuration of a drive layer.
Figure 9:
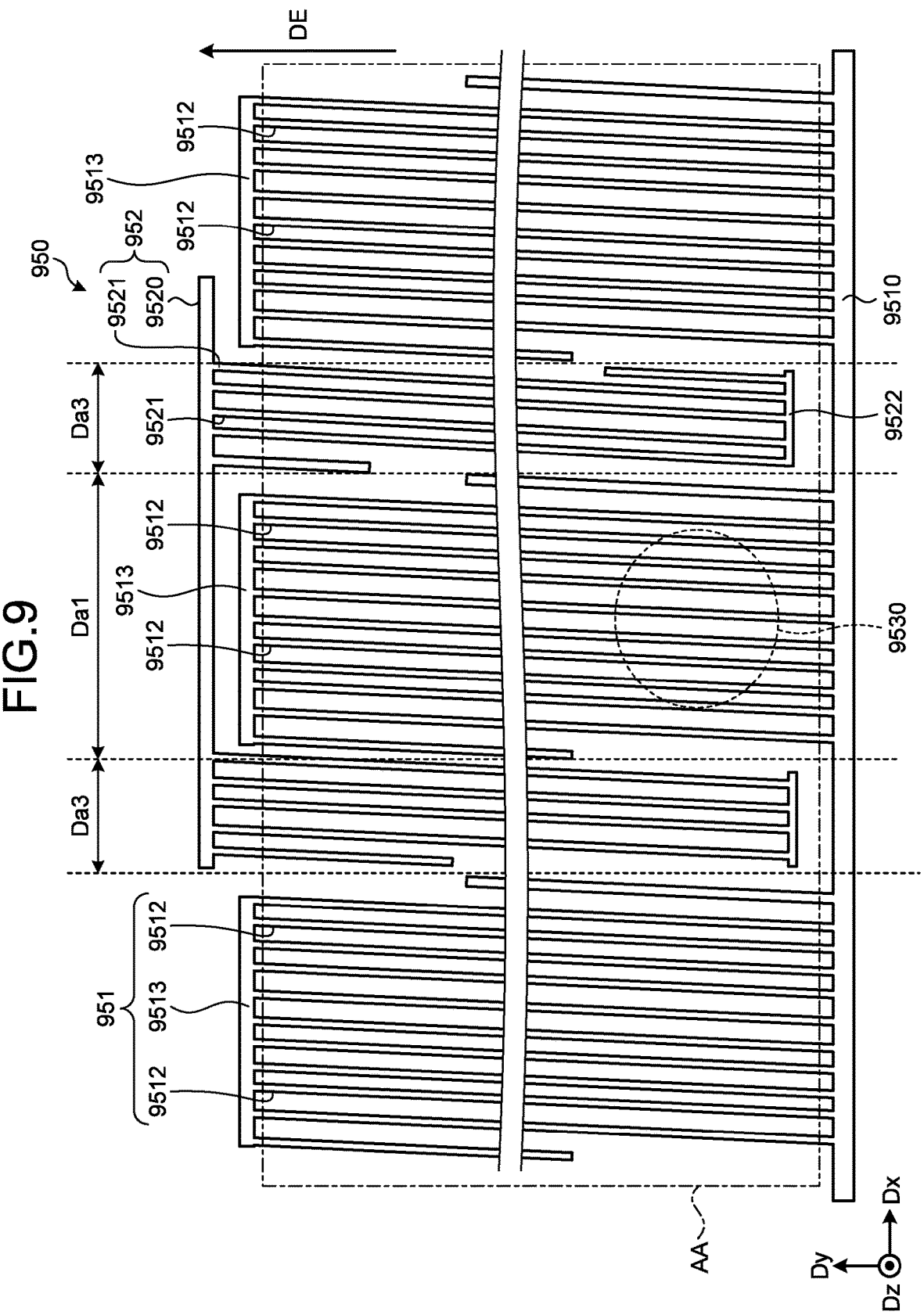
FIG. 9 is a diagram illustrating an exemplary specific configuration of an individual electrode.

The following describes an exemplary configuration of the drive layer 20 of the view-angle control device 1 with reference to FIGS. 8 and 9.

FIG. 8 is a sectional view illustrating the exemplary configuration of the drive layer 20. The drive layer 20 includes a common electrode 911, an insulating layer 912, individual electrodes 950, orientation films 914 and 921, and the liquid crystal layer 930 between the optical member layer 10A on the one surface side and the optical member layer 10B on the other surface side.

The common electrode 911 is a thin-film electrode provided with a constant potential. The constant potential is, for example, ground potential, but not limited thereto and may be changed as appropriate. The view-angle control device 1 has an effective region AA corresponding to a display region in which sub pixels are disposed in the display panel 90 stacked thereon. The common electrode 911 is provided across the effective region AA. The insulating layer 912 is stacked on the common electrode 911 and insulates the common electrode 911 from the individual electrodes 950. The individual electrode 950 is an electrode provided such that the potential can be individually controlled in the light-transmitting region 21 and the switchable region 22.

FIG. 9 is a diagram illustrating an exemplary specific configuration of the individual electrode 950. As illustrated in FIG. 9, the individual electrodes 950 includes a first electrode 951 corresponding to the light-transmitting region 21, and a second electrode 952 corresponding to the switchable region 22. The first electrode 951 includes a trunk electrode 9510, branch electrodes 9512, and a coupling electrode 9513. The second electrode 952 includes a trunk electrode 9520, branch electrodes 9521, and a coupling electrode 9522. The trunk electrode 9510 and the coupling electrode 9513 of the first electrode 951 are positioned outside the effective region AA. Similarly, the trunk electrode 9520 of the second electrode 952 is positioned outside the effective region AA. The trunk electrode 9510 and the trunk electrode 9520 extend along the first direction Dx. The trunk electrode 9510 and the trunk electrode 9520 face each other with the display region interposed therebetween when observed at the planar viewpoint.

Each branch electrode 9512 extends from the trunk electrode 9510. Each branch electrode 9512 extends in the area Da1 corresponding to the light-transmitting region 21 when observed at the planar viewpoint. A plurality of the branch electrodes 9512 are arranged in the first direction Dx in the area Da1. Each branch electrode 9521 extends from the trunk electrode 9520. Each branch electrode 9521 extends in the area Da3 corresponding to the switchable region 22 when observed at the planar viewpoint. A plurality of the branch electrodes 9521 are arranged in the first direction Dx in the area Da3. The branch electrodes 9512 and the branch electrodes 9521 extend at an angle with respect to the second direction Dy. Specifically, for example, the extending direction of the branch electrodes 9512 and the branch electrodes 9521 intersects the first direction Dx and the second direction Dy. The arrangement pitch of the branch electrodes 9512 of each first electrode 951 is equal to the arrangement pitch of the branch electrodes 9521 of each second electrode 952. In addition, the arrangement pitch of the branch electrodes 9521 adjacent to the branch electrodes 9512 is equal to the above-described arrangement pitch. Since the branch electrodes 9512 and 9521 each obliquely extend with respect to the second direction Dy as described above, an extended end part of each outermost branch electrode 9512 of the first electrode 951 is positioned in the effective region AA without being coupled to the coupling electrode 9513.

The branch electrodes 9512 are provided between adjacent switchable regions 22 in the first direction Dx. The branch electrodes 9512 and 9521 extend in the display region of the display panel 90.

The coupling electrode 9513 extends along the first direction Dx to couple the extended ends of the branch electrodes 9512 extending from the trunk electrode 9510 in one area Da1. The coupling electrode 9522 extends along the first direction Dx to couple the extended ends of the branch electrodes 9521 extending from the trunk electrode 9520 in one area Da3.

Referring back to FIG. 8, an initial orientation of the liquid crystal molecules contained in the liquid crystal layer 930 is set by the orientation films 914 and 921. In the present embodiment, the branch electrodes 9512 and the branch electrodes 9521 are arranged at an angle with respect to the second direction Dy. Thus, the orientation direction of the orientation films 914 and 921 may be parallel to the second direction Dy. Alternatively, another configuration can be employed in which the branch electrodes 9512 and the branch electrodes 9521 are arranged so as to be parallel to the second direction Dy. In this case, the orientation direction of the orientation films 914 and 921 is set at an angle with respect to the second direction Dy. In this manner, it is preferred that the extending direction of the branch electrodes and the orientation direction of the orientation films do not match exactly and the angle between the extending direction and the orientation direction be greater than 0° and equal to or less than 10°. The common electrode 911, the insulating layer 912, the individual electrodes 950, and the orientation film 914 are positioned on the other surface side of the optical member layer 10A facing the optical member layer 10B with the drive layer 20 interposed therebetween. The common electrode 911, the insulating layer 912, the individual electrode 950, and the orientation film 914 are stacked in the stated order from the one surface side toward the other surface side. The orientation film 921 is stacked on the one surface side of the optical member layer 10B facing the optical member layer 10A with the drive layer 20 interposed therebetween.

The liquid crystal layer 930 is enclosed between the orientation films 914 and 921. A spacer 9530 illustrated in FIG. 9 is provided to maintain the distance between the orientation films 914 and 921. The spacer 9530 is desirably disposed in the area Da1 as illustrated in FIG. 9. With this configuration, the light-blocking performance by the switchable region 22 in the area Da3 can be more reliably ensured. In a case where the dimension of the spacer 9530 when observed at the planar viewpoint exceeds the area Da1, the spacer 9530 is desirably disposed such that a larger area of the end part of the spacer 9530 is positioned in the area Da1.

In the following description, the individual electrode 950 is provided with a potential (for example, ground potential) equal to the potential of the common electrode 911 during non-operation of the view-angle control device 1. However, this is merely a non-limiting example of control of the view-angle control device 1 and may be changed as appropriate.

The configuration of the drive layer 20 described with reference to FIGS. 8 and 9 is of a liquid crystal panel of a fringe field switching (FFS) scheme. An initial orientation direction DE of liquid crystal molecules in the liquid crystal layer 930, which is set by the orientation films 914 and 921, extends along the second direction Dy.

When the drive layer 20 is a drive layer of the FFS scheme and the liquid crystal panel operates by a normally black scheme in which light does not transmit through the drive layer 20 during non-operation, the polarization direction of light that can transmit through the polarization layers 41 and 95 extends along the second direction Dy. In addition, in the normally black scheme, the polarization direction of light that can transmit the polarization layer 42 extends along the first direction Dx. In the normally black scheme, an ON potential is provided to the trunk electrode 9510 of the first electrode 951 during operation of the view-angle control device 1. The ON potential is a potential that is different from the potential provided to the common electrode 911 and with which the orientation direction of liquid crystal molecules in the area Da1 can be controlled such that the transmitting degree of light transmitting through the area Da1 is highest. In a case in which the constant potential is applied to the common electrode 911 as described above, the ON potential is preferably an alternating-current potential with the constant potential serving as an intermediate potential. Alternatively, a configuration can be employed in which the alternating-current potential is applied to the common electrode 911 and the ON potential is the constant potential. In the normally black scheme, when the switchable region 22 is caused to transmit light during operation of the view-angle control device 1, the ON potential is also provided to the trunk electrode 9520 of the corresponding second electrode 952. In the normally black scheme, when the switchable region 22 is caused to block light during operation of the view-angle control device 1, an OFF potential is provided to the trunk electrode 9520. The OFF potential is equal to the potential of the common electrode 911.

When the drive layer 20 is a drive layer of the FFS scheme and the liquid crystal panel operates by a normally white scheme in which light transmits through the drive layer 20 during non-operation, the polarization direction of light that can transmit through the polarization layer 95 extends along the second direction Dy. In addition, in the normally white scheme, the polarization direction of light that can transmit through the polarization layers 41 and 42 extends along the first direction Dx. In the normally white scheme, the OFF potential is provided to the trunk electrode 9510 of the first electrode 951 during operation of the view-angle control device 1. In the normally white scheme, when the switchable region 22 is caused to transmit light during operation of the view-angle control device 1, the OFF potential is also provided to the trunk electrode 9520 of the corresponding second electrode 952. In the normally white scheme, when the switchable region 22 is caused to block light during operation of the view-angle control device 1, the ON potential is provided to the trunk electrode 9520 of the second electrode 952.

The following describes, with reference to FIGS. 10 and 11, an exemplary configuration of a drive layer 20A, which is different from the configuration of the drive layer 20 described with reference to FIGS. 8 and 9. The drive layer 20A may be provided in place of the drive layer 20.

Figure 10:
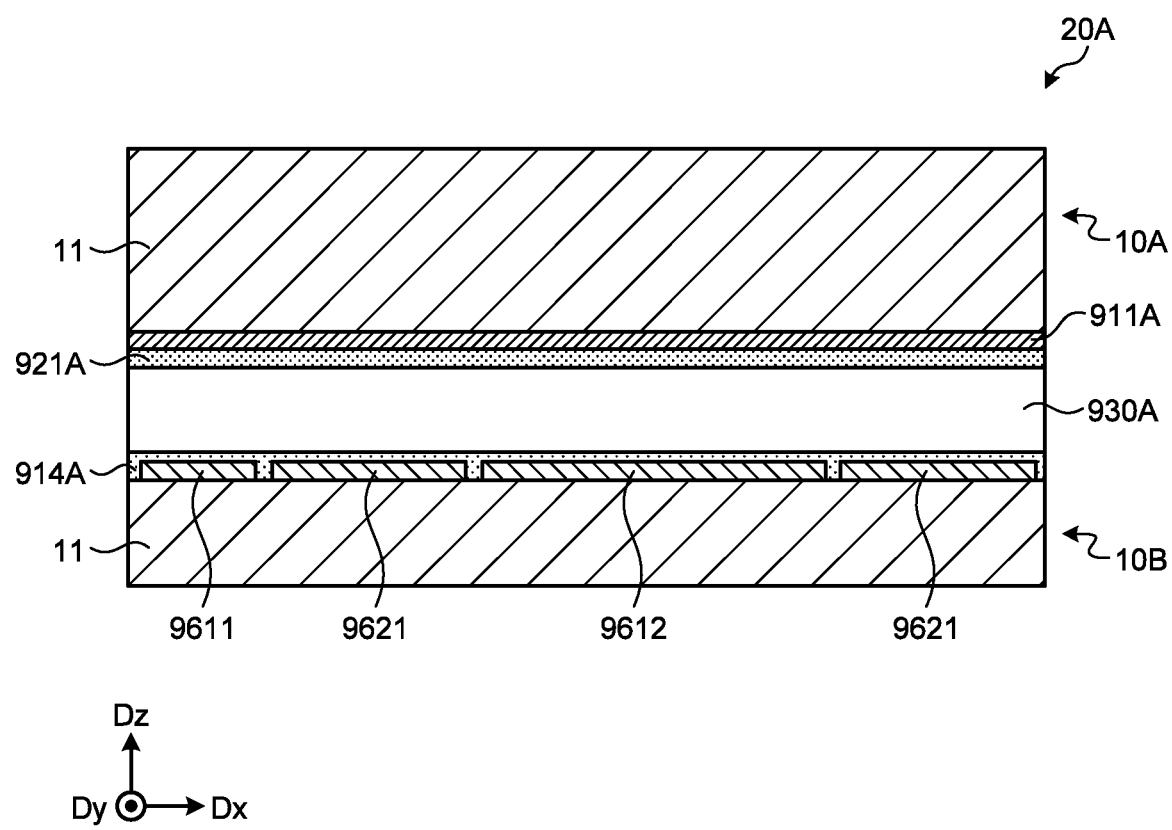
FIG. 10 is a sectional view illustrating an exemplary configuration of the drive layer.

FIG. 10 is a sectional view illustrating the exemplary configuration of the drive layer 20A. The drive layer 20A includes a common electrode 911A, branch electrodes 9612 and 9621, orientation films 914A and 921A, and a liquid crystal layer 930A between the optical member layer 10A on the one surface side and the optical member layer 10B on the other surface side.

The liquid crystal layer 930A is the same as the liquid crystal layer 930 except that the liquid crystal layer 930A is a liquid crystal of a twisted nematic (TN) scheme. The orientation film 921A is the same as the orientation film 921 except that the orientation film 921A is provided such that the initial orientation direction of liquid crystal molecules contained in the liquid crystal layer 930A extends along the first direction Dx. The common electrode 911A is the same as the common electrode 911 except that the common electrode 911A is provided between the optical member layer 10A and the orientation film 921A. The orientation film 914A is the same as the orientation film 914 except that an individual electrode layer is provided between the orientation film 914A and the optical member layer 10B. The individual electrode layer includes the branch electrodes 9612 and 9621 and trunk electrodes 9610 and 9620 illustrated in FIG. 11 to be described later. In the configuration illustrated in FIG. 10, the individual electrode layer and the orientation film 914A are stacked in this order on the other surface side of the optical member layer 10A facing the optical member layer 10B with the drive layer 20 interposed therebetween.

Figure 11:
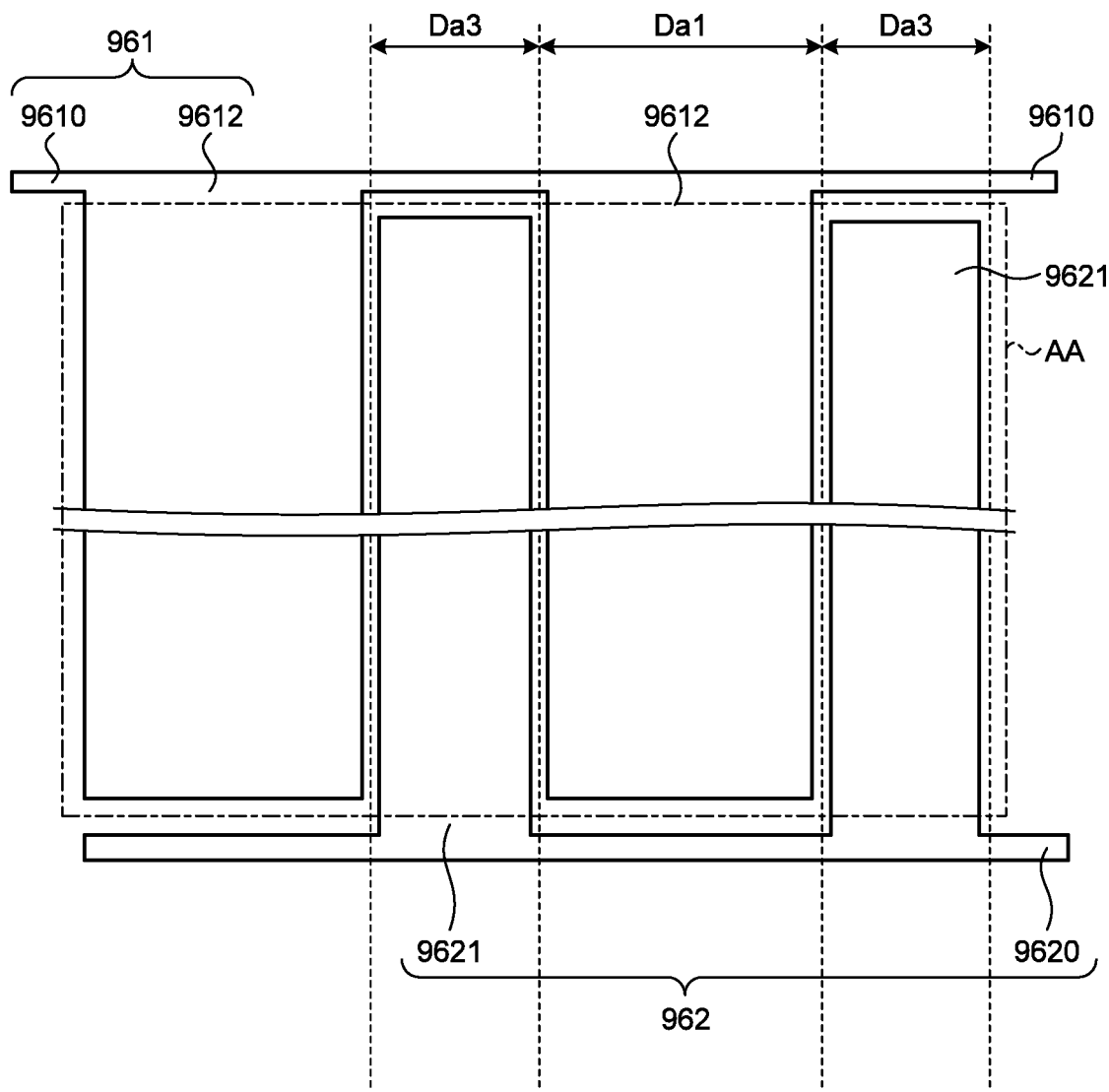
FIG. 11 is a diagram illustrating an exemplary shape of an individual electrode layer when observed at a planar viewpoint.

FIG. 11 is a diagram illustrating an exemplary shape of the individual electrode layer when observed at the planar viewpoint. As illustrated in FIG. 11, the individual electrode layer includes a first electrode 961 and a second electrode 962. The first electrode 961 is composed of the branch electrode 9612 and the trunk electrode 9610, and the second electrode 962 is composed of the branch electrode 9621 and the trunk electrode 9620. One end of the branch electrode 9612 of the first electrode 961 in the second direction Dy is coupled to the trunk electrode 9610. One end of the branch electrode 9621 of the second electrode 962 in the second direction Dy is coupled to the trunk electrode 9620. The trunk electrodes 9610 and 9620 are positioned outside the effective region AA. The trunk electrodes 9610 and 9620 extend along the first direction Dx. The trunk electrodes 9610 and 9620 face each other with the display region interposed therebetween when observed at the planar viewpoint.

The branch electrode 9612 is provided between adjacent switchable regions 22 in the first direction Dx. The branch electrode 9612 and the branch electrode 9621 extend in the display region of the display panel 90. The branch electrode 9612 extends in the area Da1 when observed at the planar viewpoint. The branch electrode 9621 extends in the area Da3 when observed at the planar viewpoint. The branch electrode 9612 has a width corresponding to the width of the area Da1 in the first direction Dx. The branch electrode 9621 has a width corresponding to the width of the area Da3 in the first direction Dx.

When the drive layer 20A is a drive layer of the TN scheme and the liquid crystal panel operates by the normally white scheme in which light transmits through the drive layer 20A during non-operation, the polarization direction of light that can transmit through the polarization layers 41 and 95 extends along the second direction Dy. In addition, in the normally white scheme, the polarization direction of light that can transmit through the polarization layer 42 extends along the first direction Dx. In the normally white scheme, the OFF potential is provided to the trunk electrode 9610 of the first electrode 961 during operation of the view-angle control device 1. In the normally white scheme, when the switchable region 22 is caused to transmit light during operation of the view-angle control device 1, the OFF potential is also provided to the trunk electrode 9620 of each corresponding second electrode 962. In the normally white scheme, when the switchable region 22 is caused to block light at operation of the view-angle control device 1, the ON potential is provided to the trunk electrode 9620.

When the drive layer 20A is a drive layer of the TN scheme and the liquid crystal panel operates by the normally black scheme in which light does not transmit through the drive layer 20A during non-operation, the polarization direction of light that can transmit through the polarization layer 95 extends along the second direction Dy. In addition, in the normally black scheme, the polarization direction of light that can transmit through the polarization layers 41 and 42 extends along the first direction Dx. In the normally black scheme, the ON potential is provided to the trunk electrode 9610 of the first electrode 961 during operation of the view-angle control device 1. In the normally black scheme, when the switchable region 22 is caused to transmit light during operation of the view-angle control device 1, the ON potential is also provided to the trunk electrode 9620 of the corresponding second electrode 962. In the normally black scheme, when the switchable region 22 is caused to block light during operation of the view-angle control device 1, the OFF potential is provided to the trunk electrode 9620 of the second electrode 962.

Although not illustrated, the view-angle control device 1 includes a power circuit configured to supply at least electricity corresponding to potential provided to the trunk electrode 9520 (or the trunk electrode 9620), and a control circuit configured to control the potential of the trunk electrode 9510 and the trunk electrode 9520 (or the trunk electrode 9520 and the trunk electrode 9620). The potential control (the ON potential or the OFF potential) by the control circuit is as described above.

Each dashed line indicating the boundary line between the areas Da1 and Da3 illustrated in FIGS. 9 and 11 extends in the second direction Dy. When the light-blocking parts 12A illustrated in FIG. 7 are provided, the boundary line between the areas Da1 and Da3 extends at the same angle along the direction intersecting both of the first direction Dx and the second direction Dy as the angle of the light-blocking parts 12A. In addition, the extending directions and extending lengths of the branch electrodes 9512, 9521, 9612, and 9621 are adjusted as appropriate in accordance with the tilt of the boundary line between the areas Da1 and Da3.

Although the disposition of a spacer such as the spacer 9530 is not illustrated in FIG. 11, the principle of spacer disposition in the TN scheme may be the same as in the FFS.

Although the exemplary configuration of the drive layer 20 (or the drive layer 20A) employed in the view-angle control device 1A is described above with reference to FIGS. 8 to 11 based on the configuration of the display device 100 described with reference to FIGS. 5 to 7, such a configuration of the drive layer 20 (or the drive layer 20A) is not limited to being employed in the display device 100 and the view-angle control device 1A. The following describes examples of a display device different from the display device 100 with reference to FIGS. 12 and 13.

Figure 12:
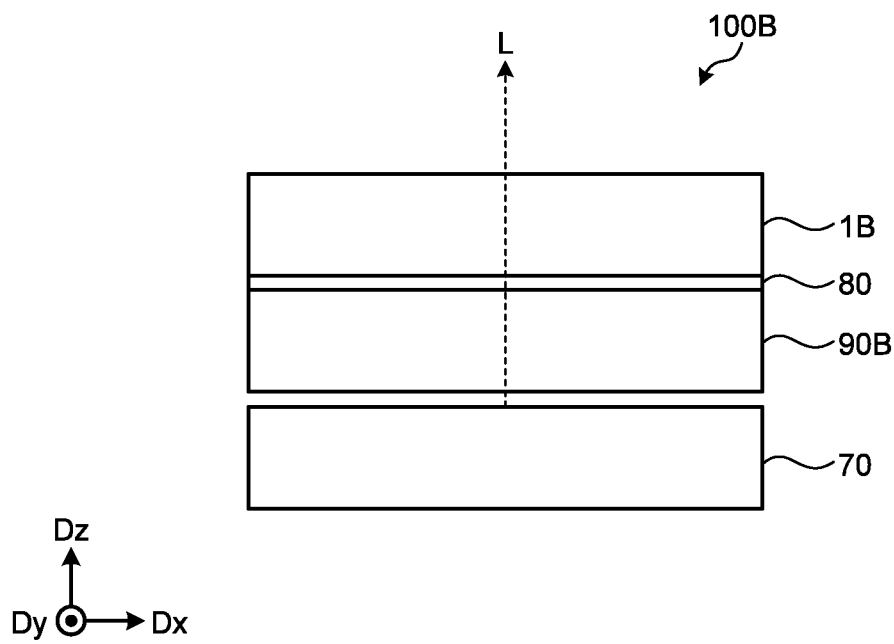
FIG. 12 is a schematic diagram illustrating an exemplary configuration of another display device.

FIG. 12 is a schematic diagram illustrating an exemplary configuration of a display device 100B. The display device 100B includes the view-angle control device 1B, the backlight 70, the bonding layer 80, and a display panel 90B. The backlight 70, the display panel 90B, the bonding layer 80, and the view-angle control device 1B are stacked in the stated order from the one surface side toward the other surface side in the display device 100B.

The display panel 90B has the same configuration as the display panel 90 except that the polarization layer 42 of the display panel 90 described with reference to FIG. 6 is provided as a component specific to the display panel 90B and the polarization layer 95 of the display panel 90 described with reference to FIG. 6 is provided as a component doubling as the polarization layer 41 of the view-angle control device 1B. Except for the features specially noted above, the display device 100B has the same configuration as the display device 100.

Figure 13:
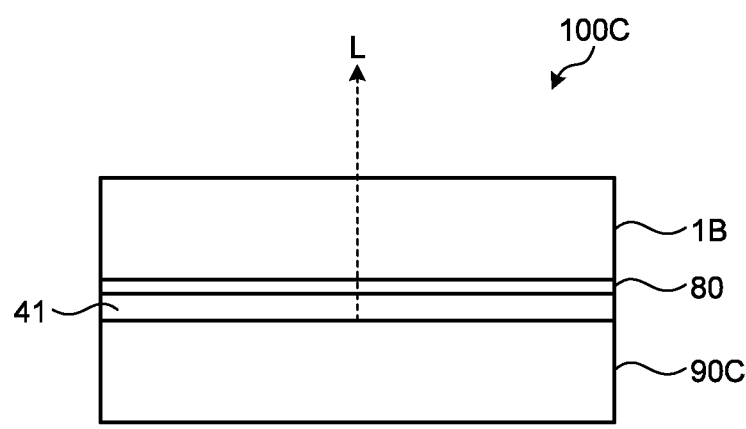
FIG. 13 is a schematic diagram illustrating an exemplary configuration of another display device.

FIG. 13 is a schematic diagram illustrating an exemplary configuration of a display device 100C. The display device 100C includes the view-angle control device 1B, the polarization layer 41, the bonding layer 80, and a display panel 90C. The display panel 90C, the polarization layer 41, the bonding layer 80, and the view-angle control device 1B are disposed in the stated order from the one surface side toward the other surface side in the display device 100B.

The display panel 90C is a light-emitting display panel. Specifically, the display panel 90C is, for example, an organic light emitting diode (OLED) panel or a micro LED image display panel, but is not limited to any of them and may be a light-emitting display panel of any other scheme. The bonding layer 80 of the display device 100C bonds the polarization layer 41 provided in the display panel 90C and the view-angle control device 1B. The backlight 70 is omitted in the display device 100C since the display panel 90C is a light-emitting display panel. The polarization layer 41 serves as both a polarization layer provided in the display panel 90C made of an OLED and a lower-surface-side polarization layer of the view-angle control device 1B. More specifically, the polarization layer 41 employs a configuration in which a polarization layer having an absorption axis in the first direction Dx or the second direction Dy is stacked on a λ/4 polarization layer. As described above, whether the polarization layer has an absorption axis in the first direction or an absorption axis in the second direction depends on whether the view-angle control device 1B employs the normally black scheme or the normally white scheme. Except for the features specially noted above, the display device 100C is the same as the display device 100.

The above description is made on the case in which the view-angle control device 1 (refer to FIG. 1) is employed in which two optical member layers 10B are provided on the one surface side of the drive layer 20 and two optical member layers 10A are provided on the other surface side. However, a configuration in which at least one of the number of optical member layers 10A and the number of optical member layers 10B is different from that of the view-angle control device 1 may be employed in place of the view-angle control device 1. The following describes, with reference to FIGS. 14 to 19, the configuration in which at least one of the number of optical member layers 10A and the number of optical member layers 10B is different from that of the view-angle control device 1.

Figure 14:
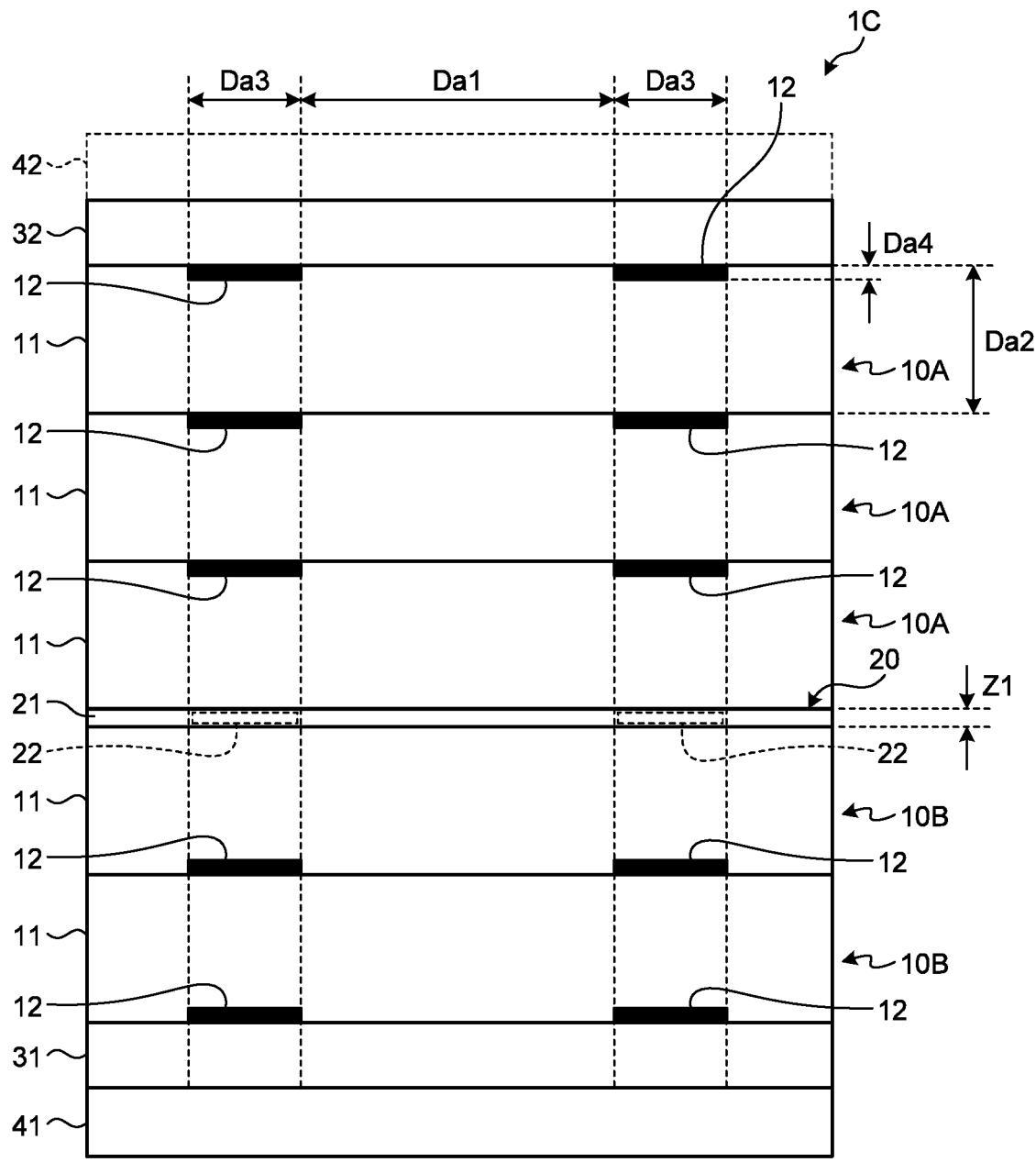
FIG. 14 is a schematic diagram illustrating an exemplary configuration of another view-angle control device.

FIG. 14 is a schematic diagram illustrating an exemplary configuration of a view-angle control device 1C. The view-angle control device 1C includes three optical member layers 10A between the drive layer 20 and the substrate 32. For example, the area Da1 is 18 μm wide in the view-angle control device 1C. Except for the features specially noted above, the view-angle control device 1C is the same as the view-angle control device 1.

Figure 15:
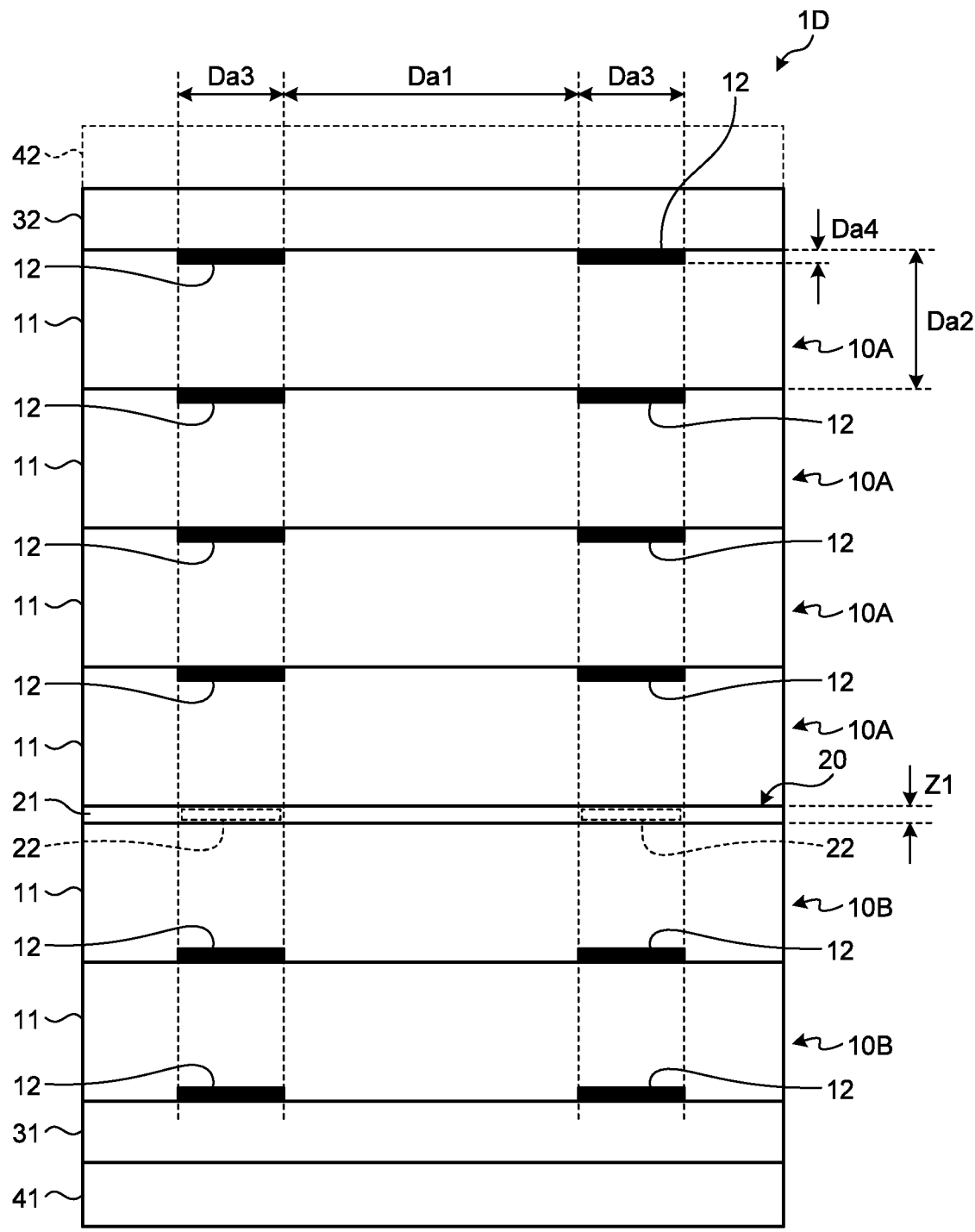
FIG. 15 is a schematic diagram illustrating an exemplary configuration of another view-angle control device.

FIG. 15 is a schematic diagram illustrating an exemplary configuration of a view-angle control device 1D. The view-angle control device 1D includes four optical member layers 10A between the drive layer 20 and the substrate 32. For example, the area Da1 is 22 μm wide in the view-angle control device 1D. Except for the features specially noted above, the view-angle control device 1C is the same as the view-angle control device 1.

As described above with reference to FIGS. 14 and 15, the area Da1 can be larger as the number of optical member layers 10A is larger. Thus, the view-angle control device 1C and the view-angle control device 1D can achieve a higher aperture ratio than the view-angle control device 1.

The following describes another method that can increase the aperture ratio without increasing the number of optical member layers 10A. For example, consider a case in which the thickness Da2 of the optical member layer 10A closer to the drive layer 20 among the two optical member layers 10A in the view-angle control device 1 is set to 7.5 μm and the thickness Da2 of the optical member layer 10A closer to the substrate 32 is set to 10.5 μm. In this case, the area Da1 can be expanded by 20%. In this manner, it is possible, by increasing the thickness of a base member 11 disposed farther from the backlight 70, to increase the aperture ratio.

Figure 16:
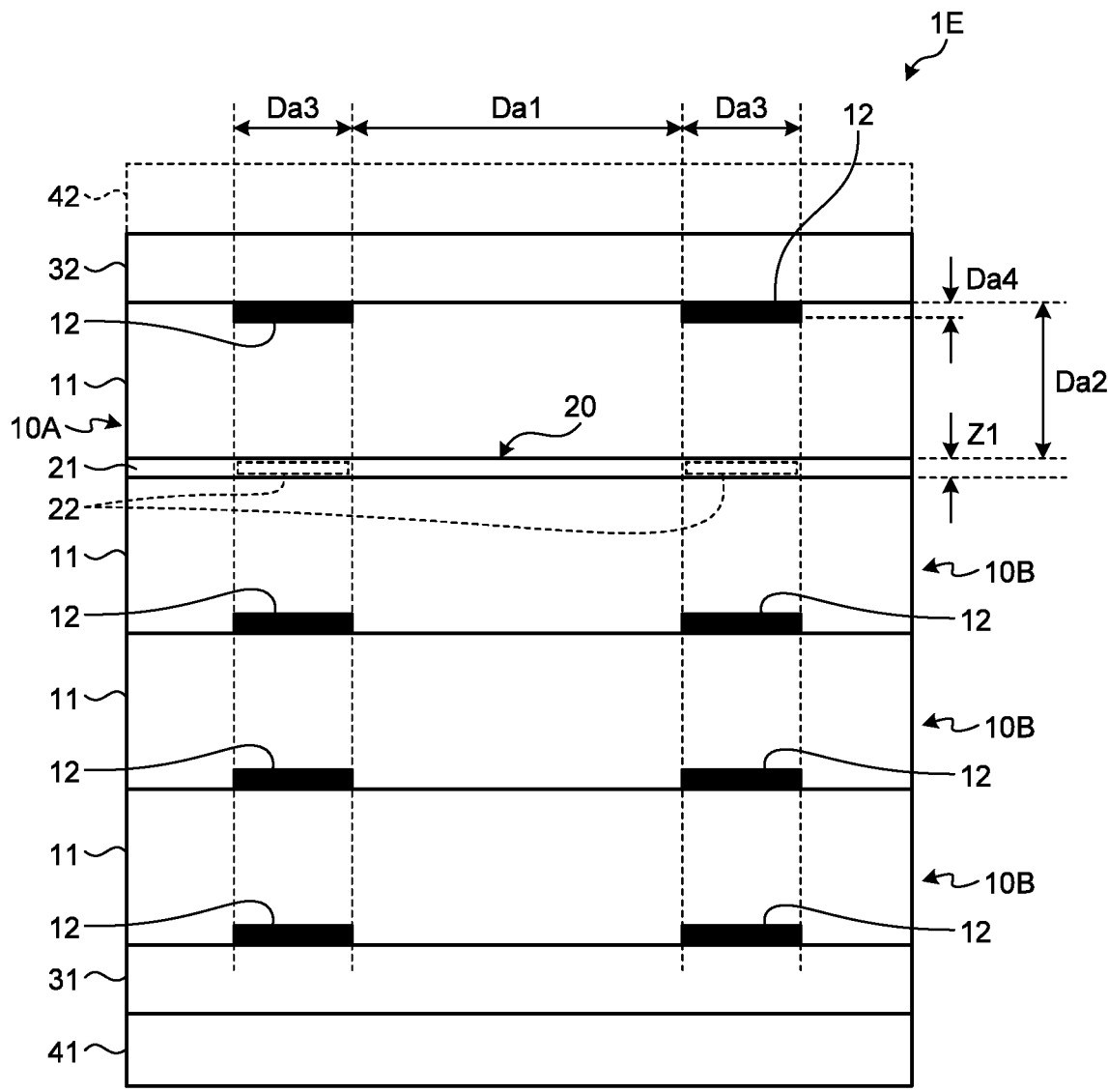
FIG. 16 is a schematic diagram illustrating an exemplary configuration of another view-angle control device.

FIG. 16 is a schematic diagram illustrating an exemplary configuration of a view-angle control device 1E. The view-angle control device 1E includes one optical member layer 10A between the drive layer 20 and the substrate 32 and includes three optical member layers 10B between the drive layer 20 and the substrate 31. Except for the features specially noted above, the view-angle control device 1E is the same as the view-angle control device 1.

FIG. 17 is a schematic diagram illustrating an exemplary configuration of a view-angle control device 1F. The view-angle control device 1F includes three optical member layers 10A between the drive layer 20 and the substrate 32 and includes one optical member layer 10B between the drive layer 20 and the substrate 31. Except for the features specially noted above, the view-angle control device 1F is the same as the view-angle control device 1.

Figure 18:
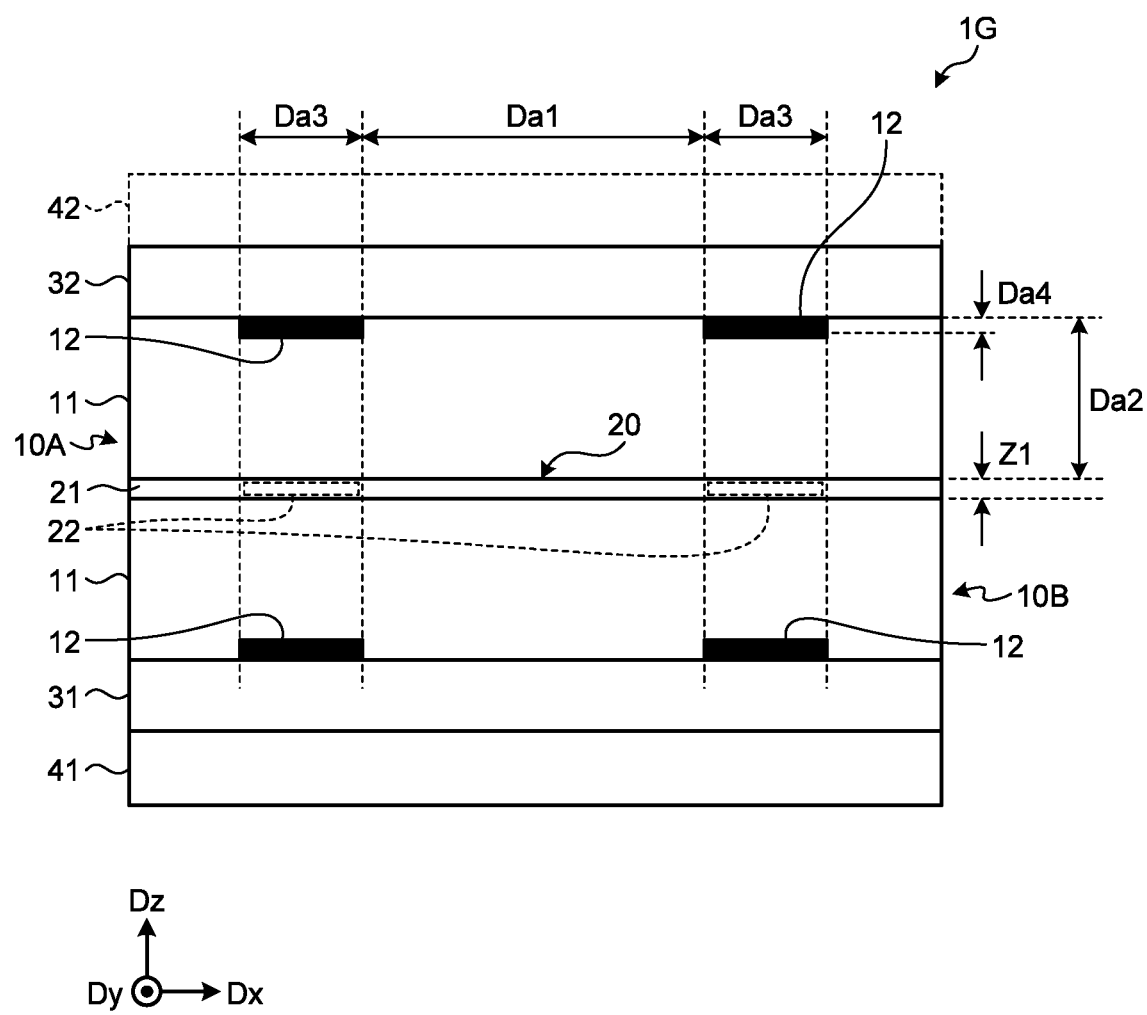
FIG. 18 is a schematic diagram illustrating an exemplary configuration of another view-angle control device.

FIG. 18 is a schematic diagram illustrating an exemplary configuration of a view-angle control device 1G. The view-angle control device 1G includes one optical member layer 10A between the drive layer 20 and the substrate 32 and includes one optical member layer 10B between the drive layer 20 and the substrate 31. In the view-angle control device 1G, the area Da1 is, for example, 8 μm wide. Except for the features specially noted above, the view-angle control device 1G is the same as the view-angle control device 1.

FIG. 19 is a schematic diagram illustrating an exemplary configuration of a view-angle control device 1H. The view-angle control device 1H includes two optical member layers 10A between the drive layer 20 and the substrate 32, and the drive layer 20 and the substrate 31 are stacked. Thus, no optical member layers 10B are provided in the view-angle control device 1H. In the view-angle control device 1H, the area Da1 is, for example, 8 μm wide. Except for the features specially noted above, the view-angle control device 1H is the same as the view-angle control device 1.

In any of the configurations described above with reference to FIGS. 14 to 19, any one of the polarization layers 41 and 42 may be omitted as in the view-angle control device 1A or the view-angle control device 1B for the above-described view-angle control device 1.

As described above, according to the present disclosure, a view-angle control device (for example, view-angle control device 1, 1C, 1D, 1E, 1F, 1G, or 1H) includes: a drive layer (for example, drive layer 20 or the drive layer 20A) in which light-transmitting regions 21 and switchable regions 22 are alternately arranged in one direction, each light-transmitting region being configured to transmit light, each switchable region 22 being switchable between a light-transmitting state and a light-blocking state through switching of the orientation of liquid crystal (for example, liquid crystal layer 930 or liquid crystal layer 930A); and a plurality of optical member layers (optical member layers 10A or optical member layers 10A and 10B) stacked together with the drive layer. Each optical member layer includes a base member 11 that transmits light, and a light-blocking part 12 that is provided at a position overlapping with the switchable region 22 and blocks light. The light-blocking part 12 is disposed on a surface of the base member 11 on a farther side from the drive layer.

With this configuration, a relative narrow view angle and a relative wide view angle can be switched by switching each switchable region 22 between a light-transmitting state and a light-blocking state without attaching and detaching members. Moreover, as described above with reference to FIG. 4, it is possible to increase luminance when observed at a front viewpoint as compared to the comparative example.

In the view-angle control devices 1, 1A, 1B, 1C, 1D, 1E, 1F, and 1G, two of the optical member layers (optical member layers 10A and 10B) face each other with the drive layer (for example, drive layer 20 or drive layer 20A) interposed therebetween. With this configuration, the view angle can be further restricted.

In the view-angle control devices 1, 1A, 1B, 1C, 1D, 1E, 1F, and 1H, two or more optical member layers 10A or 10B are stacked on at least one side of the drive layer (for example, drive layer 20 or drive layer 20A). With this configuration, the view angle can be further restricted.

In the view-angle control device (for example, view-angle control device 1, 1A, 1B, 1C, 1D, 1E, 1F, 1G, or 1H), a polarization layer (at least one of polarization layers 41 and 42) is provided at least on the one surface side. With this configuration, the view angle can be switched by the drive layer (for example, drive layer 20 or drive layer 20A).

The above-described display device (for example, display device 100, 100B, or 100C) includes the above-described view-angle control device (for example, any one of the view-angle control device 1, 1C, 1D, 1E, 1F, 1G, or 1H), and the display panel (for example, any one of the display panel 90, 90B, or 90C) stacked together with the view-angle control device and configured to output an image. With this configuration, the view angle of an image output from the display device can be switched by the view-angle control device. Thus, a relative narrow view angle and a relative wide view angle can be switched without attaching and detaching members. Moreover, as described above with reference to FIG. 4, luminance when observed at a front viewpoint can be increased as compared to the comparative example.

The display panel (for example, any one of the display panel 90, 90B, or 90C) includes a polarization layer (one of the polarization layers 41 and 42) at least on the view-angle control device (for example, any one of the view-angle control device 1A or 1B) side, and the view-angle control device includes a polarization layer (the other of the polarization layers 41 and 42) on an opposite side to the display panel side. With this configuration, the view angle can be switched by the view-angle control device by using the polarization layer included in the display panel.

The view-angle control device (for example, view-angle control device 1, 1A, 1B, 1C, 1D, 1E, 1F, 1G, or 1H) does not need to be integrally provided with the display device such as the display device 100, 100B, or 100C. When the view-angle control device is provided alone, both the polarization layer 41 and the polarization layer 42 may be provided in the view-angle control device.

It should be understood that the present disclosure provides any other effects achieved by aspects described above in the present embodiment, such as effects that are clear from the description of the present specification or effects that could be thought of by the skilled person in the art as appropriate.

What is claimed is:

1. A view-angle control device comprising:
   a drive layer in which light-transmitting regions and switchable regions are alternately arranged in one direction, each light-transmitting region being configured to transmit light, each switchable region being switchable between a light-transmitting state and a light-blocking state through switching of liquid crystal orientation;
   a plurality of optical member layers stacked together with the drive layer in a stacking direction; and
   a pair of polarization layers facing each other with the drive layer interposed therebetween,
   wherein
   each optical member layer includes
      a base member that transmits light, and
      a light-blocking part that is provided at a position overlapping with a corresponding one of the switchable regions and blocks light,
   the light-blocking part faces the corresponding one of the switchable regions with the base member interposed therebetween,
   the drive layer includes a liquid crystal layer,
   the drive layer further includes, on one side of an upper side of the liquid crystal layer and a lower side of the liquid crystal layer when viewed in the stacking direction, a common electrode provided across the light-transmitting regions and the switchable regions, an insulating layer covering the common electrode, and branch electrodes extending along an extending direction of the switchable regions,
   each of the branch electrodes has a width less than a width of each light-transmitting region and a width of each switchable region,
   two or more of the branch electrodes are disposed in each of the light-transmitting regions and the switchable regions,
   among the branch electrodes, branch electrodes provided in the switchable regions are coupled to each other,
   among the branch electrodes, branch electrodes provided in the light-transmitting regions are coupled to each other,
   the drive layer includes a pair of orientation films with the liquid crystal layer interposed therebetween,
   an angle between an orientation direction of the orientation films and an extending direction of the branch electrodes is set to an angle greater than 0° and equal to or less than 10°,
   a polarization direction of light that can transmit through the polarization layers intersects the extending direction of the branch electrodes, and
   in the drive layer, each of the switchable regions is brought into the light-blocking state by applying an OFF potential to the branch electrodes provided in the light-transmitting regions and applying an ON potential to the branch electrodes provided in the switchable region.

2. The view-angle control device according to claim 1, wherein two of the optical member layers face each other with the drive layer interposed therebetween.

3. The view-angle control device according to claim 2, wherein two or more of the optical member layers are stacked at least on one side of the drive layer.

4. The view-angle control device according to claim 1, wherein a polarization layer is provided at least on one surface side of the view-angle control device.

5. A view-angle control device comprising:
a drive layer in which light-transmitting regions and switchable regions are alternately arranged in one direction, each light-transmitting region being configured to transmit light, each switchable region being switchable between a light-transmitting state and a light-blocking state through switching of liquid crystal orientation;
a plurality of optical member layers stacked together with the drive layer in a stacking direction; and
a pair of polarization layers facing each other with the drive layer interposed therebetween,
wherein
each optical member layer includes a base member that transmits light and a light-blocking part that is provided at a position overlapping with a corresponding one of the switchable regions and blocks light,
the light-blocking part faces the corresponding one of the switchable regions with the base member interposed therebetween,
the drive layer includes a liquid crystal layer,
the drive layer further includes branch electrodes extending along an extending direction of the switchable regions on one side of an upper side of the liquid crystal layer and a lower side of the liquid crystal layer when viewed in the stacking direction,
the drive layer further includes a common electrode provided across the light-transmitting regions and the switchable regions on the other side of the upper side of the liquid crystal layer and the lower side of the liquid crystal layer when viewed in the stacking direction,
the branch electrodes include first branch electrodes provided in the light-transmitting regions and second branch electrodes provided in the switchable regions,
each first branch electrode has a width corresponding to a width of each light-transmitting region,
each second branch electrode has a width corresponding to a width of each switchable region,
the second branch electrodes provided in the switchable regions are coupled to each other,
the first branch electrodes provided in the light-transmitting regions are coupled to each other,
the drive layer includes a first orientation film provided between the liquid crystal layer and the first and second branch electrodes and a second orientation film provided between the liquid crystal layer and the common electrode,
an orientation direction of the first orientation film intersects an orientation direction of the second orientation film,
a polarization direction of light that can transmit through one of the polarization layers intersects a polarization direction of light that can transmit through the other of the polarization layers,
the one of the polarization layers is disposed on the first and second branch electrode side,
the polarization direction of the one of the polarization layers is parallel to the orientation direction of the first orientation film,
the other of the polarization layers is disposed on the common electrode side,
the polarization direction of the other of the polarization layers is parallel to the orientation direction of the second orientation film, and
in the drive layer, each of the switchable regions is brought into the light-blocking state by applying an OFF potential to the branch electrodes provided in the light-transmitting regions and applying an ON potential to the branch electrodes provided in the switchable region.

6. A display device comprising:
the view-angle control device according to claim 1; and
a display panel stacked together with the view-angle control device and configured to output an image.

7. The display device according to claim 6, wherein the display panel includes a polarization layer at least on the view-angle control device side, and
the view-angle control device includes a polarization layer on an opposite side to the display panel side.

* * * * *